US010562426B2

(12) United States Patent
Scott et al.

(10) Patent No.: US 10,562,426 B2
(45) Date of Patent: Feb. 18, 2020

(54) VEHICLE HEAD RESTRAINT WITH MOVEMENT MECHANISM

(71) Applicant: LEAR CORPORATION, Southfield, MI (US)

(72) Inventors: Raymond E. Scott, Birmingham, MI (US); Arjun Yetukuri, Rochester Hills, MI (US); Jasmine Pizana, Scottville, MI (US); Michael R. Powell, Waterford, MI (US); James Brackenbury, El Paso, TX (US); Peter Festag, Erding (DE)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 15/983,296

(22) Filed: May 18, 2018

(65) Prior Publication Data
US 2019/0176670 A1  Jun. 13, 2019

Related U.S. Application Data

(60) Provisional application No. 62/597,996, filed on Dec. 13, 2017.

(51) Int. Cl.
| B60N 2/80 | (2018.01) |
| B60N 2/806 | (2018.01) |
| B60N 2/829 | (2018.01) |
| B60N 2/868 | (2018.01) |
| B60N 2/879 | (2018.01) |
| B60N 2/02 | (2006.01) |
| B60N 2/885 | (2018.01) |

(52) U.S. Cl.
CPC .......... *B60N 2/829* (2018.02); *B60N 2/0244* (2013.01); *B60N 2/868* (2018.02); *B60N 2/879* (2018.02); *B60N 2/885* (2018.02); *B60N 2002/0268* (2013.01)

(58) Field of Classification Search
CPC ........ B60N 2/829; B60N 2/879; B60N 2/885; B60N 2/0244
USPC ..................................... 297/216.12, 391–410
See application file for complete search history.

(56) References Cited

U.S. PATENT DOCUMENTS

| 3,512,605 A | * | 5/1970 | McCorkle | .............. | H04R 5/023 |
| | | | | | 297/397 X |
| 3,944,020 A | | 3/1976 | Brown | | |

(Continued)

FOREIGN PATENT DOCUMENTS

| DE | 10 2010 035 203 A1 | 3/2012 |
| JP | 2001-298787 A | 10/2001 |
| JP | 2004-135023 A | 4/2004 |

OTHER PUBLICATIONS

US 8,483,402 B2, 07/2013, Hartung et al. (withdrawn)

*Primary Examiner* — Rodney B White
(74) *Attorney, Agent, or Firm* — Brooks Kushman P.C.

(57) ABSTRACT

A head restraint is provided for a seat for use with a motor vehicle. The head restraint includes a base configured to be attached to the seat, and a main portion configured to be positioned between the base and a head of a seat occupant when the base is attached to the seat and the seat is mounted in the vehicle. The head restraint further includes at least one movement mechanism associated with at least one of the base and the main portion and configured to move at least part of the main portion laterally or upwardly and downwardly relative to the base.

31 Claims, 12 Drawing Sheets

(56) References Cited

U.S. PATENT DOCUMENTS

| | | | |
|---|---|---|---|
| 3,976,162 A | 8/1976 | Cummings | |
| 4,042,791 A * | 8/1977 | Wiseman | H04R 5/023 |
| | | | 297/391 X |
| 4,490,842 A * | 12/1984 | Watanabe | B60R 11/0217 |
| | | | 297/391 X |
| 4,758,047 A * | 7/1988 | Hennington | B60R 11/0217 |
| | | | 297/397 |
| 4,797,934 A * | 1/1989 | Hufnagel | A47C 7/383 |
| | | | 297/391 X |
| 4,830,434 A * | 5/1989 | Ishida | B60N 2/829 |
| | | | 297/408 |
| 5,011,225 A * | 4/1991 | Nemoto | B60N 2/856 |
| | | | 297/408 |
| 5,370,446 A * | 12/1994 | Bancod | A47C 7/38 |
| | | | 297/408 |
| 5,635,686 A | 6/1997 | Fenton | |
| 5,669,666 A * | 9/1997 | Lee | B60N 2/853 |
| | | | 297/410 X |
| 5,975,637 A * | 11/1999 | Geuss | B60N 2/002 |
| | | | 297/410 X |
| 5,997,091 A * | 12/1999 | Rech | B60N 2/885 |
| | | | 297/391 |
| 6,010,192 A * | 1/2000 | King | A47C 7/383 |
| | | | 297/217.4 |
| 6,120,099 A | 9/2000 | Reikeras et al. | |
| 6,540,299 B1 * | 4/2003 | Gosk | B60N 2/0252 |
| | | | 297/410 |
| 7,066,545 B2 * | 6/2006 | Terada | B60N 2/0252 |
| | | | 297/410 |
| 7,264,313 B2 * | 9/2007 | Clough | A47C 7/38 |
| | | | 297/406 X |
| 7,520,616 B2 | 4/2009 | Ooba et al. | |
| 7,621,598 B2 * | 11/2009 | Humer | B60N 2/66 |
| | | | 297/410 |
| 8,035,575 B2 | 10/2011 | Okabe et al. | |
| 8,483,413 B2 | 7/2013 | Hartung et al. | |
| 8,616,633 B2 * | 12/2013 | Truckenbrodt | B60N 2/865 |
| | | | 297/216.12 |
| 8,899,685 B2 * | 12/2014 | Haeske | B60N 2/809 |
| | | | 297/410 |
| 8,950,813 B2 * | 2/2015 | Nawaz | B60N 2/806 |
| | | | 297/406 |
| 8,998,334 B2 * | 4/2015 | Radhakrishnan | A47C 7/38 |
| | | | 297/406 X |
| 9,344,788 B2 | 5/2016 | Barksdale et al. | |
| 9,440,566 B2 | 9/2016 | Subat | |
| 9,788,118 B2 | 10/2017 | Bleacher et al. | |
| 2003/0178880 A1 * | 9/2003 | Hannah | A61G 5/12 |
| | | | 297/406 |
| 2004/0195894 A1 * | 10/2004 | Pal | B60N 2/4279 |
| | | | 297/406 |
| 2005/0105744 A1 | 5/2005 | Lee | |
| 2008/0185894 A1 | 8/2008 | Yetukuri et al. | |
| 2009/0058162 A1 * | 3/2009 | Boes | B60N 2/888 |
| | | | 297/406 |
| 2009/0058163 A1 * | 3/2009 | Bokelmann | B60N 2/829 |
| | | | 297/410 |
| 2010/0148550 A1 * | 6/2010 | Kidd | B60N 2/879 |
| | | | 297/217.4 |
| 2012/0161489 A1 * | 6/2012 | Nam | A47C 7/38 |
| | | | 297/406 |
| 2013/0121515 A1 | 5/2013 | Hooley et al. | |
| 2014/0035337 A1 * | 2/2014 | Jarry | B60N 2/0232 |
| | | | 297/391 X |
| 2015/0203008 A1 * | 7/2015 | Wang | B60N 2/809 |
| | | | 297/406 |
| 2019/0111820 A1 * | 4/2019 | Subat | B60N 2/01 |
| 2019/0232840 A1 * | 8/2019 | Close | B60N 2/806 |
| 2019/0315256 A1 * | 10/2019 | Maloney | B60N 2/865 |

* cited by examiner

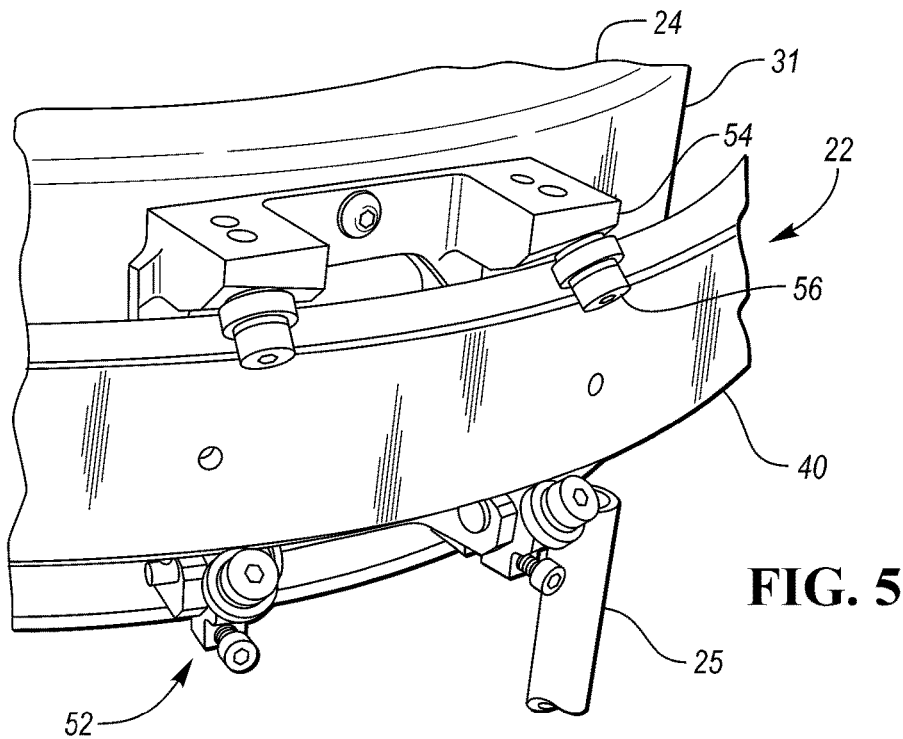
FIG. 5
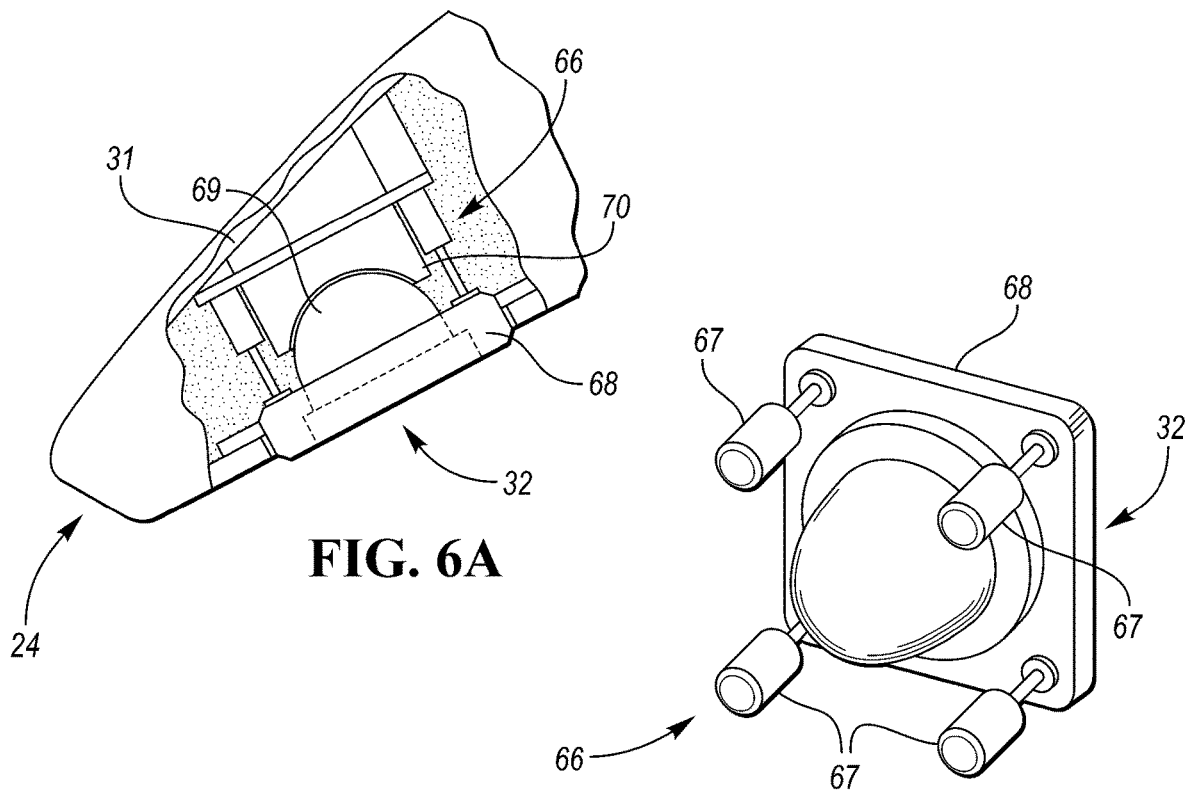
FIG. 6A
FIG. 6B

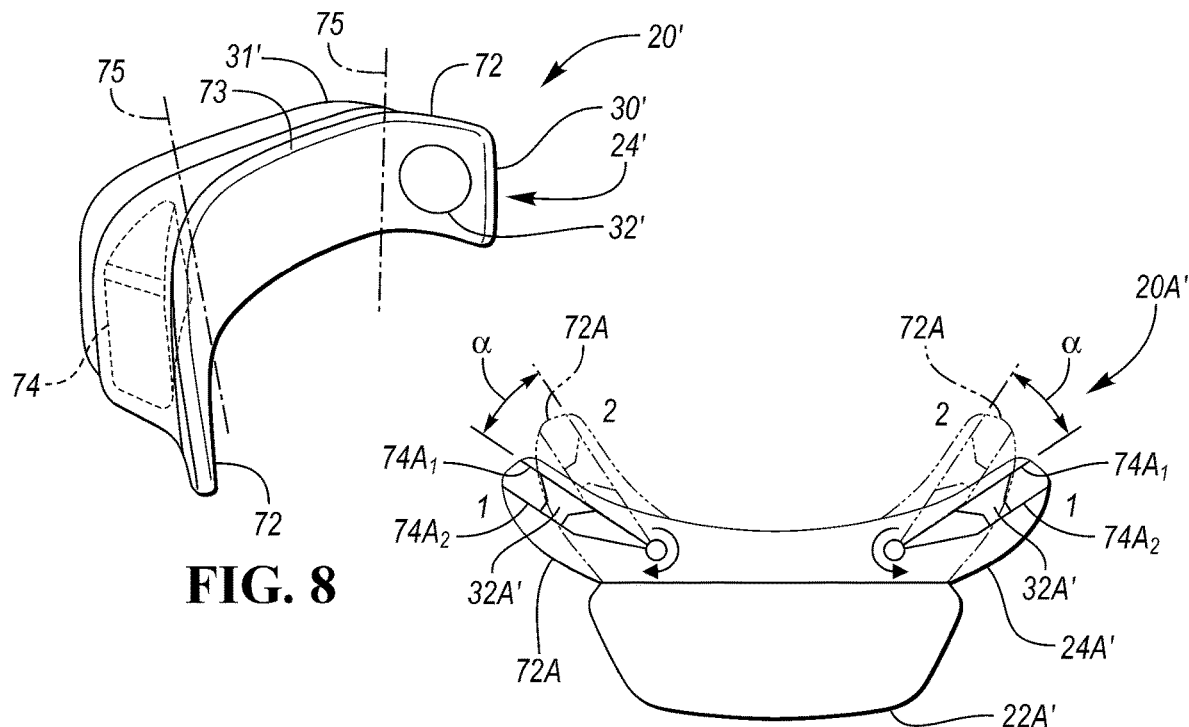
FIG. 8
FIG. 9
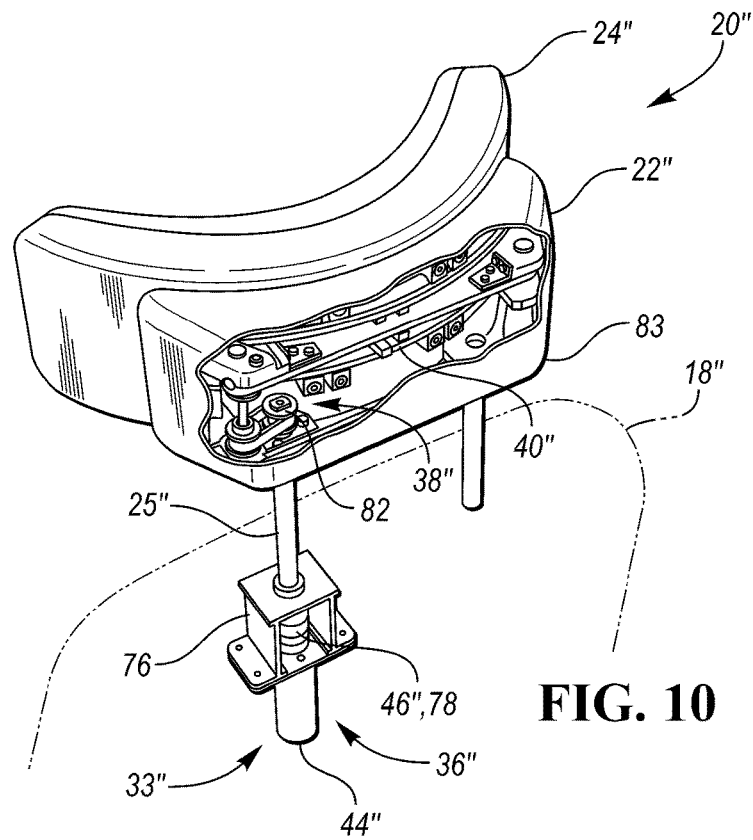
FIG. 10

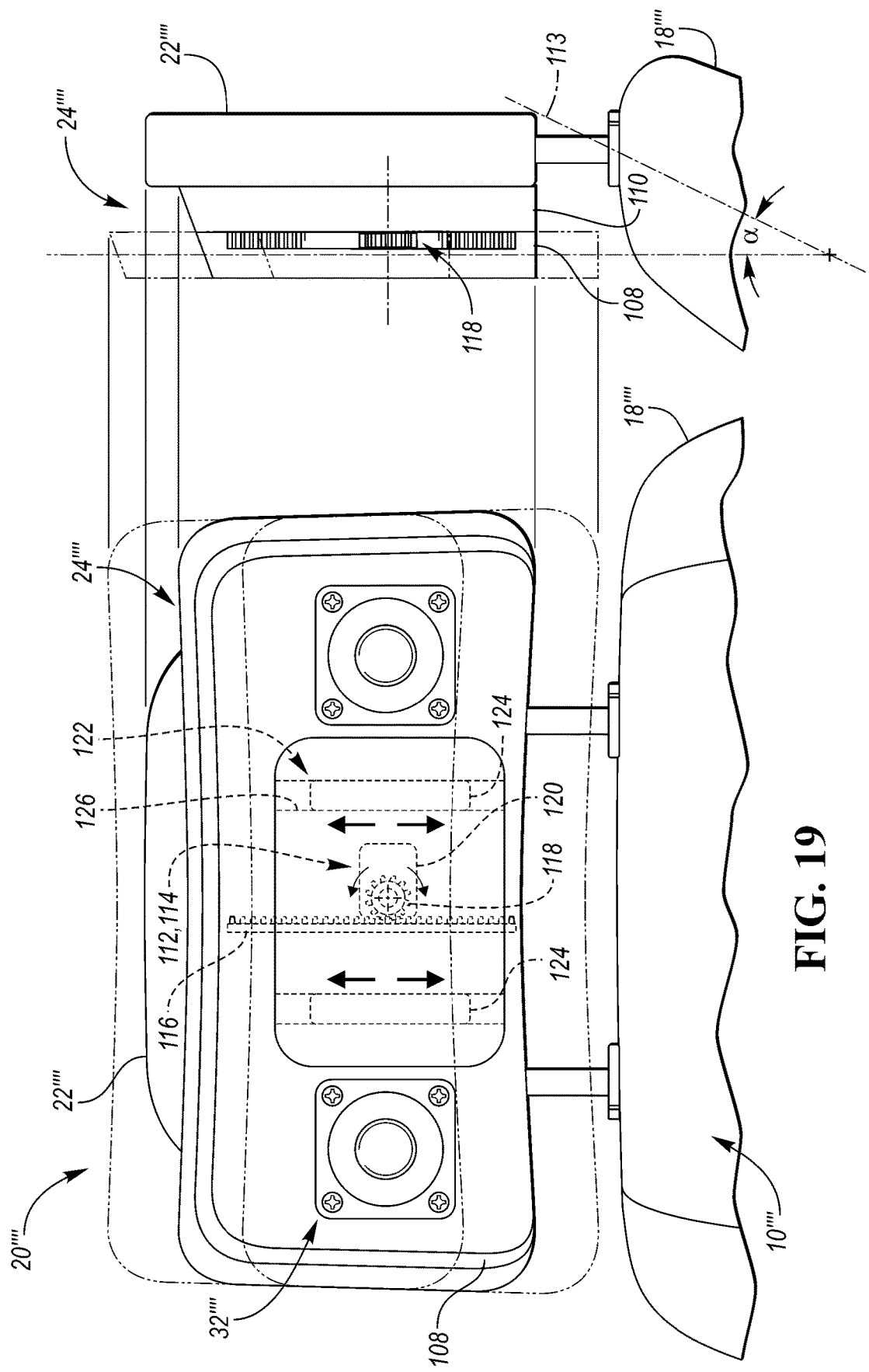

VEHICLE HEAD RESTRAINT WITH MOVEMENT MECHANISM

CROSS-REFERENCE TO RELATED APPLICATIONS

This application claims the benefit of U.S. provisional application Ser. No. 62/597,996 filed Dec. 13, 2017, the disclosure of which is hereby incorporated in its entirety by reference herein.

TECHNICAL FIELD

The disclosure relates to a vehicle head restraint for use with a motor vehicle, and to a seat including a head restraint.

BACKGROUND

A seat for a motor vehicle may be provided with a head restraint. Examples of such head restraints are disclosed in U.S. Pat. Nos. 6,120,099, 8,483,413 B2 and 9,440,566 B2.

SUMMARY

A head restraint is provided for a seat for use with a motor vehicle. The head restraint includes a base configured to be attached to the seat, and a main portion configured to be positioned between the base and a head of a seat occupant when the base is attached to the seat and the seat is mounted in the vehicle. The head restraint further includes at least one movement mechanism associated with at least one of the base and the main portion and configured to move at least part of the main portion laterally or upwardly and downwardly relative to the base.

A head restraint arrangement for use with a seat of a motor vehicle is also provided. The head restraint arrangement includes a head restraint having a base that is attachable to the seat, and a main portion configured to be positioned between the base and a head of a seat occupant when the base is attached to the seat and the seat is mounted in the vehicle. The head restraint further includes at least one movement mechanism associated with at least one of the base and the main portion and configured to move at least part of the main portion laterally or upwardly and downwardly relative to the base. In addition, the head restraint arrangement includes a controller configured to control operation of the at least one movement mechanism.

A vehicle seat, according to the disclosure, for a motor vehicle includes a seat back and a head restraint mounted on the seat back. The head restraint includes a base attached to the seat back, and a main portion configured to be positioned between the base and a head of a seat occupant when the vehicle seat is mounted in the vehicle and the seat occupant is positioned on the seat. The head restraint further includes at least one movement mechanism associated with at least one of the base and the main portion and configured to move at least part of the main portion laterally or upwardly and downwardly relative to the base when the seat back is in an upright position.

While exemplary embodiments are illustrated and disclosed, such disclosure should not be construed to limit the claims. It is anticipated that various modifications and alternative designs may be made without departing from the scope of the disclosure.

BRIEF DESCRIPTION OF THE DRAWINGS

FIG. 5 is a fragmentary rear perspective view of the head restraint showing a guide arrangement of the head restraint;

FIG. 6A is a fragmentary cross-sectional schematic view of the main portion of the head restraint showing an example adjustment mechanism for adjusting position of a speaker assembly with respect to the main portion of the head restraint;

FIG. 6B is a rear perspective view of the speaker assembly shown in FIG. 6A, along with four actuators of the adjustment mechanism;

FIG. 8 is a front perspective view of a second embodiment of a head restraint according to the present disclosure, wherein the head restraint includes a main portion having movable wings;

FIG. 9 is a schematic view of another example configuration of a head restraint including a main portion having movable wings;

FIG. 10 is a rear perspective view of a third embodiment of a head restraint according to the present disclosure, wherein the head restraint includes a base portion, a main portion positioned in front of the base portion, and a movement mechanism for moving the main portion with respect to the base portion, and wherein the movement mechanism includes a motor assembly and a drive arrangement configured as a belt drive arrangement;

FIG. 19 is a front schematic view of a fifth embodiment of a head restraint according to the present disclosure for use with a vehicle seat;

FIG. 20 is a side schematic view of the head restraint of FIG. 19; and

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
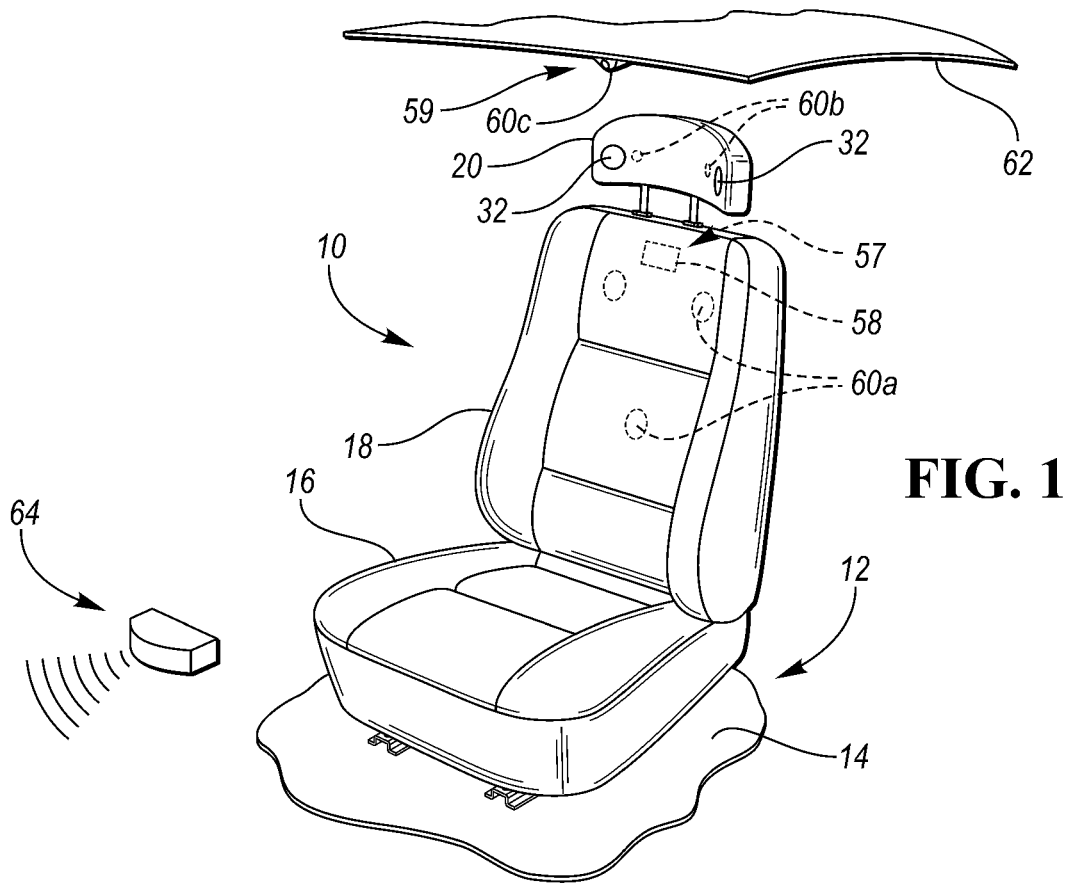
FIG. 1 is a perspective view of a vehicle seat including a head restraint according to the present disclosure.

FIG. 1 shows a vehicle seat 10 according to the disclosure mounted in a motor vehicle 12. For example, the vehicle seat 10 may be mounted to a floor 14 of the vehicle 12. The seat 10 includes a seat bottom 16, a seat back 18 pivotally attached to the seat bottom 16, and a head restraint 20 mounted on the seat back 18.

Figure 2:
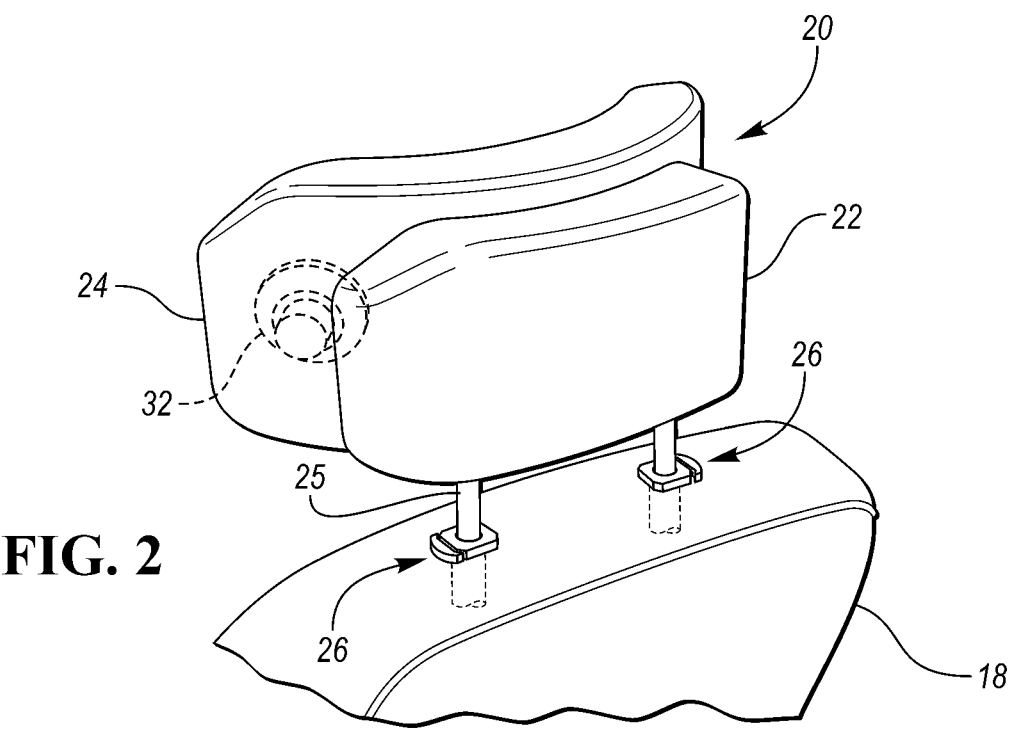
FIG. 2 is a rear perspective view of the head restraint of FIG. 1, wherein the head restraint includes a base portion and a main portion positioned in front of the base portion and that is movable with respect to the base portion.
Figure 3:
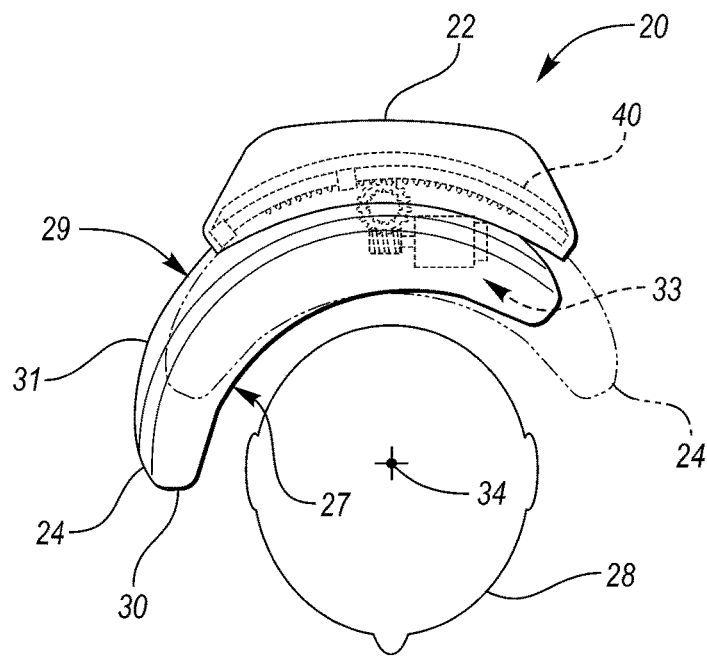
FIG. 3 is a top view of the head restraint of FIG. 1.

Referring to FIGS. 2 and 3, the head restraint 20 includes a base portion or base 22 attached to the seat back 18, and a front portion or main portion 24 configured to be positioned in front of the base 22 when the seat 10 is mounted in the vehicle 12. As shown in FIG. 2, the head restraint 20 further includes one or more head restraint support members, such as head restraint posts 25, connected to the base 22, and the head restraint support posts 25 may be connected to the seat back 18 with one or more lockable guide sleeve assemblies 26 that are configured to lock the head restraint posts 25 in any one of multiple vertical use positions. As shown in FIG. 3, the main portion 24 is configured to extend between or be positioned between the base 22 and a head 28 of a seat occupant when the head restraint 20 is mounted on the seat back 18, the seat 10 is mounted in the vehicle 12 and the seat occupant is positioned on the seat 10. For example, the main portion 24 may have a first surface, such as a front surface 27, that is configured to face the head 28 of the seat occupant, and an opposite second surface (e.g., the first and second surfaces are on opposite sides of the main portion 24), such as a rear surface 29, that is configured to face a front surface of the base 22. In the embodiment shown in FIG. 3, the main portion 24 includes a cushion section 30 that defines the front surface 27, and a rear support section 31 that supports the cushion section 30 and defines the rear surface 29. A central portion of the cushion section 30 is configured to be aligned with the head 28 of the seat occupant (e.g., positioned directly behind the head 28 of the seat occupant) when the main portion 24 is in a home position, shown in phantom lines in FIG. 3. Furthermore, in the embodiment shown in FIG. 3, the main portion 24 has an arcuate shape and is configured to face an entire rear portion of the head 28 of the seat occupant. Referring to FIGS. 1 and 2, the head restraint 20 may also include one or more speaker assemblies or speakers 32 attached to the main portion 24.

Figure 4:
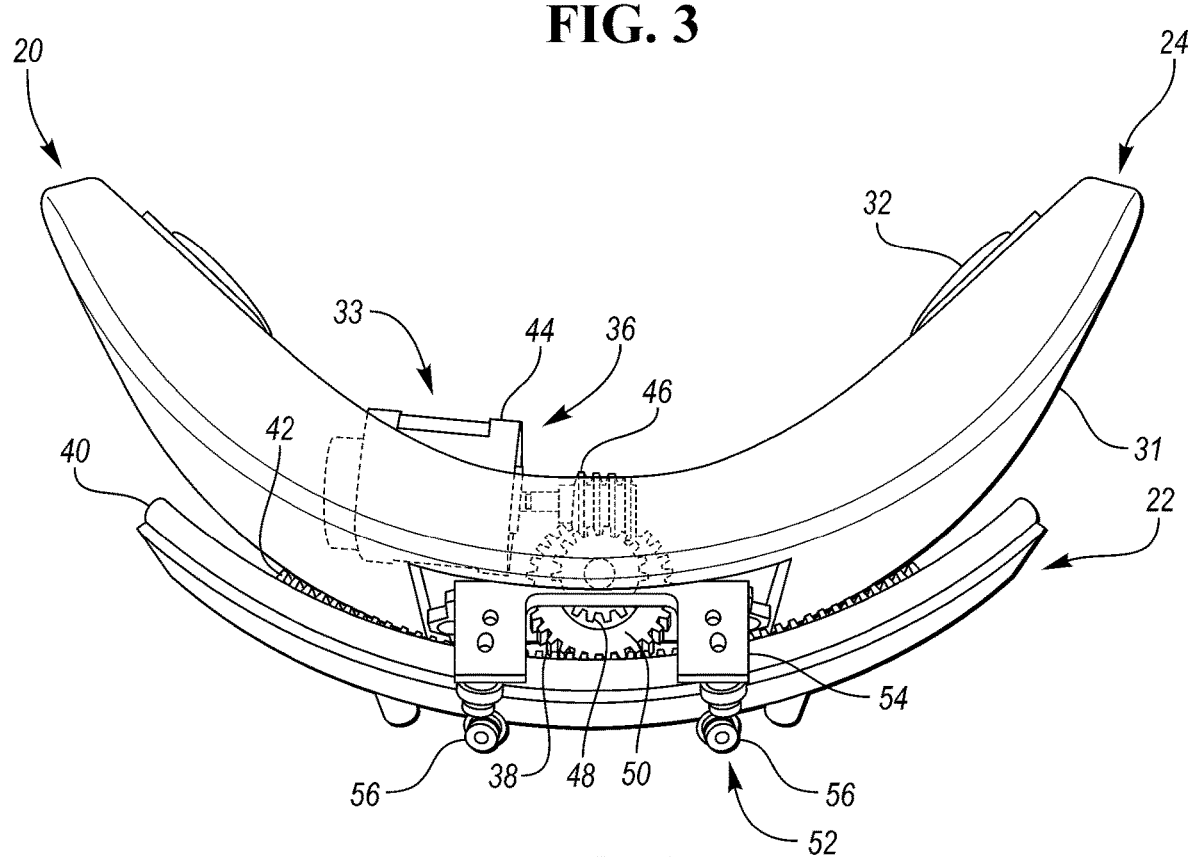
FIG. 4 is an enlarged top view of the head restraint with a front section of the main portion broken away to show a movement mechanism for moving the main portion with respect to the base portion, wherein the movement mechanism includes a motor assembly and a drive arrangement configured as a gear arrangement.

Referring to FIGS. 3 and 4, the head restraint 20 further includes a movement mechanism 33 associated with the base 22 and the main portion 24 and configured to move the main portion 24 laterally relative to the base 22. For example, the movement mechanism 33 may move the entire main portion 24 along a straight lateral path, or along a curved lateral path. In the illustrated embodiment, the movement mechanism 33 is configured to rotate the entire main portion 24 along an upright axis 34, so that the main portion 24 moves along a curved lateral path.

The movement mechanism 33 may have any suitable configuration, such as a motor for driving at least one rotatable member (e.g., at least one gear, belt drive rotor or roller, cable drive rotor or roller, etc.). As a more detailed example, the movement mechanism 33 may include a motor assembly 36 and a drive arrangement, such as a gear arrangement 38, connected to or otherwise associated with the motor assembly 36. The gear arrangement 38 may be mounted on or otherwise associated with one of the base 22 and the main portion 24, and the gear arrangement 38 is configured to engage a guide member, such as a track, rack or rail 40, mounted on or otherwise associated with the other of the base 22 and the main portion 24. In the embodiment shown in FIG. 4, the base 22 includes the rail 40, which may be mounted on a support structure of the base 22 (e.g., a housing or frame of the base 22), and the motor assembly 36 and the gear arrangement 38 are mounted on the main portion 24. Furthermore, the rail 40 has multiple teeth 42 and a curved configuration in the illustrated embodiment.

The motor assembly 36 includes an electric motor 44 connected to a power supply, and a rotatable drive member, such as a drive pinion or gear 46, connected to the motor 44. The gear arrangement 38 includes a first gear or intermediate gear 48 engaged with the drive gear 46, and a second gear or main gear 50 that is fixedly connected to the intermediate gear 48 and engaged with the rail 40. When the motor 44 is activated, the motor 44 is operable to drive the drive gear 46 in either of two directions, and the drive gear 46 engages the intermediate gear 48 and likewise causes the intermediate gear 48 to rotate in either of two directions. Since the main gear 50 is fixed to the intermediate gear 48 and rotatable therewith, rotation of the intermediate gear 48 also causes rotation of the main gear 50. As the main gear 50 rotates, it walks along the rail 40, thereby moving the main portion 24 with respect to the base 22.

Referring to FIGS. 4 and 5, the head restraint 20 may also include a guide arrangement 52 for guiding movement of the main portion 24 relative to the base 22. For example, the guide arrangement 52 may include a bracket 54 connected to one of the base 22 and the main portion 24, and one or more guide members, such as rollers 56, rotatably connected to the bracket 54 and engageable with the other of the base 22 and the main portion 24. In the embodiment shown in FIGS. 4 and 5, the bracket 54 is connected to a plastic housing of the support section 31 of the main portion 24, and the rollers 56 are engageable with the base 22. Specifically, the rollers 56 include two upper rollers 56 that engage an upper portion of the rail 40 of the base 22, and two lower rollers that engage a lower portion of the rail 40 of the base 22. In the illustrated embodiment, the gear arrangement 38 is also rotatably connected to the bracket 54.

Referring to FIGS. 1 and 4, the movement mechanism 33 may be operated to automatically move the main portion 24 based on at least one input factor related to location or position of the head 28 of the seat occupant. For example, the at least one input factor may be indicative of the position of the seat occupant's head 28 and/or a portion of the seat occupant's head 28, such as her ears, or the at least one input factor may be useable to estimate position of the seat occupant's head 28 and/or a portion of the seat occupant's head 28, such as her ears. In one embodiment, the motor assembly 36 of the movement mechanism 33 may communicate wirelessly or via a wired connection with a control arrangement 57, which may include a control unit or controller 58 in communication with a detection system 59 including one or more detection devices 60 such as sensors, cameras, etc. For example, the controller 58 may be connected, directly or wirelessly, to one or more detection devices 60a, 60b (e.g., sensors) in the vehicle seat 10 and/or one or more detection devices 60c (e.g, sensors or cameras) positioned in the vehicle 12, such as in a dashboard or a roof system of the vehicle 12, and that are configured to detect position of the head 28 of the seat occupant, or that may otherwise provide information (i.e., input) to the controller 58 that is usable by the controller 58 to estimate position of the seat occupant's head 28 and/or a portion of the seat occupant's head 28, such as her ears. The controller 58 may then control operation of the movement mechanism 33 to adjust position of the main portion 24 based on that input. For example, if the one or more detection devices 60 provide input to the controller 58 indicating that the seat occupant has turned her head 28 to the left (e.g., rotated her head 28 counterclockwise when viewed from above), or is in the process of turning her head 28 to the left, then the controller 58 may activate the movement mechanism 33 to rotate the main portion 24 to the right (e.g., to rotate the main portion 24 counterclockwise when viewed from above) to properly align the main portion 24 with the seat occupant's head 28 and/or to adjust the main portion 24 for blind spot reduction. As another example, if the one or more detection devices 60 provide input to the controller 58 indicating that the seat occupant's right ear is more forward than her left ear (e.g., that the seat occupant has rotated her head 28 to the left), then the controller 58 may activate the movement mechanism 33 to rotate the main portion 24 to the right to properly align the speakers 32 with the seat occupant's ears.

In the embodiment shown in FIG. 1, the controller 58 is positioned in the seat back 18. In another embodiment, the controller 58 may be positioned in the head restraint 20 and may be part of the movement mechanism 33, for example. As another example, the controller 58 may be positioned remotely from the vehicle seat 10, such as in a center console of the vehicle 12. Furthermore, the head restraint 20 and the controller 58 may together be referred to as a head restraint arrangement.

As also shown in the embodiment of FIG. 1, the detection system 59 includes one or more sensors 60a (e.g, capacitive sensors, pressure sensors, proximity sensors, etc.) positioned in the seat back 18, one or more sensors 60b positioned in the head restraint 20 and a camera 60c attached to a roof 62 of the vehicle 12. The sensors 60a may be configured to detect position (e.g., orientation) of the occupant's torso or a portion of the torso (e.g., shoulders), and that information may be used by the controller 58, for example, to estimate position of the seat occupant's head 28 and/or a portion of the seat occupant's head 28, such as her ears. The sensors 60b may be positioned proximate the speakers 32 and may be configured to detect location of the seat occupant's head 28 and/or a portion of the seat occupant's head 28, such as her ears. The camera 60c is positioned over the vehicle seat 10 and may be generally aligned with the rotational axis 34 of the head restraint 20 when the vehicle seat 10 is positioned in a typical use position (e.g., design position). Furthermore, the camera 60c may be configured to detect position of the seat occupant's head 28 and/or a portion of the seat occupant's head 28, such as her ears.

In addition to, or as an alternative to, the input received from the above mentioned detection devices 60, the controller 58 may receive input from other sources. For example, the seat occupant may input her height into an input device that communicates with the controller 58. As another example, the controller 58 may receive input regarding various aspects of the vehicle seat 10, such as head restraint position (e.g, vertical position, fore/aft position), a recline angle of the seat back 18, cushion height of the seat bottom 16, etc. That input may come from other detection devices (e.g., sensors) associated with the vehicle seat 10 and/or movement mechanisms (e.g., head restraint vertical adjustment mechanism, head restraint fore/aft adjustment mechanism, recliners, cushion lift mechanisms, etc.) of the vehicle seat 10. Furthermore, the controller 58 may use one or more of the above input factors to estimate position of the seat occupant's head 28 and/or a portion of the seat occupant's head 28, such as her ears.

The movement mechanism 33 may also be operable to automatically return the main portion 24 of the head restraint 20 to the home position (shown in FIG. 1 and in phantom lines in FIG. 3) based on an impact event or potential impact event. For example, the controller 58 may be configured to communicate with a suitable detection system 64 (e.g., RADAR system, LIDAR system, IR camera system, ultrasonic sensor system, etc.), positioned at any suitable location in the vehicle 12 (e.g., front portion, side portions and/or rear portion of the vehicle 12) for detecting an impact event or potential impact event. If such an event is detected, the detection system 64 may provide suitable input to the controller 58, and the controller 58 may then cause the movement mechanism 33 to return the main portion 24 to the home position or other position intended to provide optimal support for the seat occupant's head 28.

Furthermore, the motor 44 of the movement mechanism 33 may be configured to operate at multiple speeds so that movement speed of the main portion 24 may be controlled as needed. For example, the motor 44 may be a two speed motor that operates at low speed for adjustment of the main portion 24 during normal use, and at high speed in order to return the main portion 24 to the home position, such as during an impact event or potential impact event. Alternatively, the motor 44 may be a single speed motor.

The movement mechanism 33, detection devices 60, and controller 58 may individually, collectively, or in any combination comprise appropriate circuitry, such as one or more appropriately programmed processors (e.g., one or more microprocessors, microcontrollers and/or programmable digital signal processors) and associated memory, which may include stored operating system software and/or application software (e.g., code or instructions) executable by the processor(s) for controlling operation thereof, so that the movement mechanism 33, detection devices 60 and controller 58 may perform particular algorithms represented by the functions and/or operations described herein, including interaction between and/or cooperation with each other. One or more of such processors, as well as other circuitry and/or hardware, may be included in a single ASIC (Application-Specific Integrated Circuitry), or several processors and various circuitry and/or hardware may be distributed among several separate components, whether individually packaged or assembled into a SoC (System-on-a-Chip).

Referring to FIGS. 6A and 6B, the head restraint 20 may further include an adjustment arrangement or mechanism 66 associated with each speaker 32 for moving the speaker 32 with respect to the main portion 24. Only one speaker 32 and associated adjustment mechanism 66 are shown in FIGS. 6A and 6B, with the understanding that the other speaker 32 may be provided with the same or similar adjustment mechanism. While the adjustment mechanism 66 may include any suitable adjustment device, such as one or more solenoid actuators, gear actuators, etc., in the embodiment shown in FIGS. 6A and 6B, the adjustment mechanism 66 includes four electric actuators 67 (e.g., solenoid actuators) positioned at four different regions (e.g., corners) of a mounting bezel 68 of the speaker 32. Each actuator 67 has a rear end connected to the support section 31 of the main portion 24 of the head restraint 20, such as with a screw or other fastener, and a movable front end (e.g., shaft) that is connected to the mounting bezel 68, such as with a screw or other fastener. In the illustrated embodiment, the speaker 32 further includes a speaker body 69 fixedly attached to the mounting bezel 68, and the speaker body 69 has a rear end rotatably received in a socket 70 mounted on the support section 31 of the main portion 24. With such a configuration, one or more of the actuator 67 may be activated to rotate or pivot the speaker 32 in any direction. All four of the actuators 67 may also be activated simultaneously to move (e.g., extend or retract) in the same direction to thereby move the speaker 32 linearly (e.g., fore or aft) with respect to the main portion 24 of the head restraint 20. In such case, the rear end of the speaker body 69 may move out of the socket 70.

The above described control arrangement 57 may also be used to control the adjustment mechanisms 66. In that regard, the controller 58 may receive input related to position of the occupant's head 28 or a portion of the seat occupant's head 28 as mentioned above, and the controller 58 may control one or both of the adjustment mechanisms 66, via a direct connection or wireless connection, to adjust position of one or both of the speakers 32 with respect to the seat occupant's head 28 in order to optimally position the speakers 32 with respect to the occupant's ears.

Figure 7A:
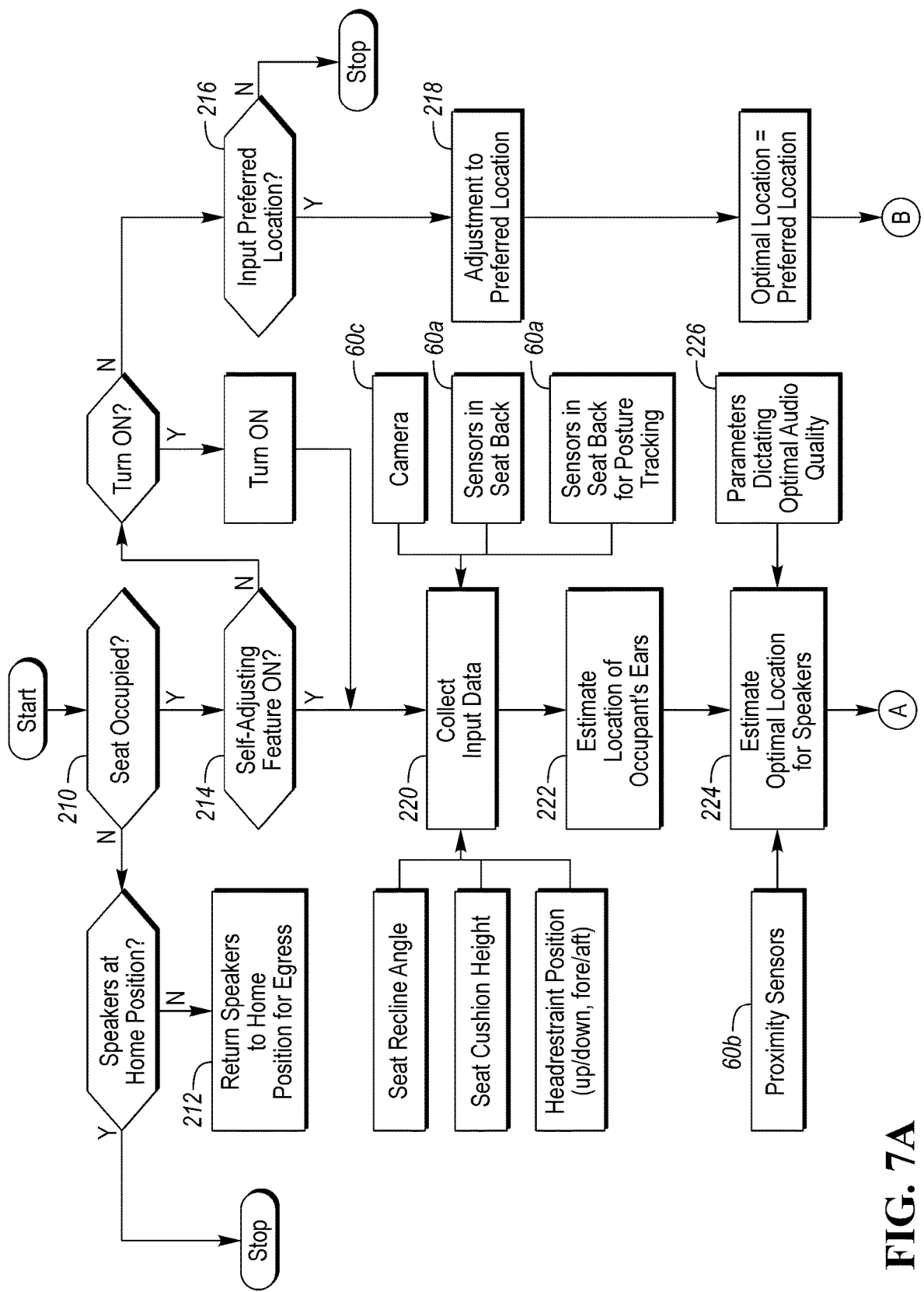
FIGS. 7A and 7B show a flowchart with example steps for positioning the head restraint and associated speakers with respect to a seat occupant.
Figure 7B:
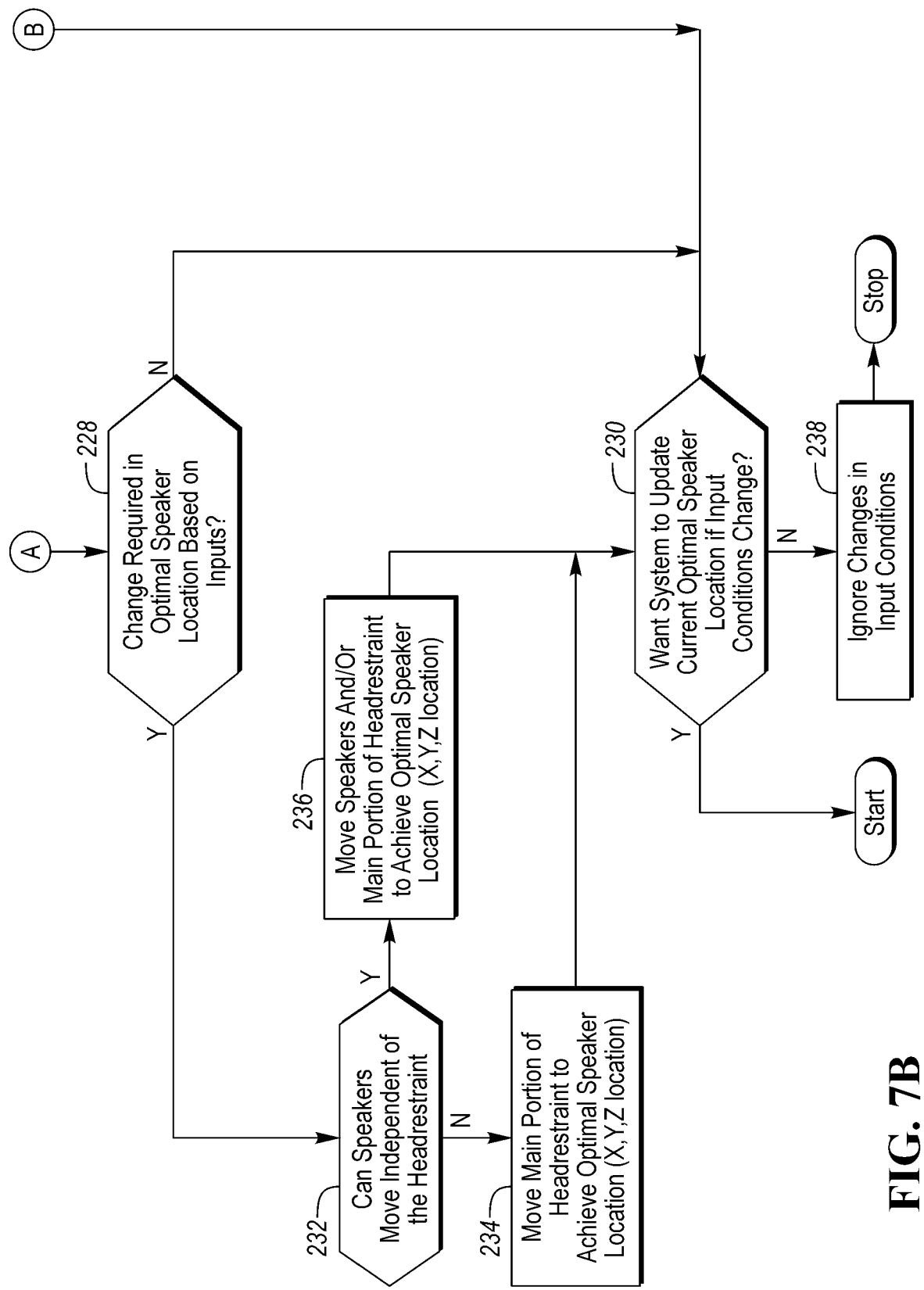

Referring to FIGS. 7A and 7B, a flowchart is provided to illustrate example steps for positioning the head restraint 20 and associated speakers 32 with respect to the seat occupant's head 28, and more specifically with respect to her ears. At step 210, the controller 58 may determine whether or not the seat 10 is occupied by a seat occupant based on input from the detection system 59 (e.g., sensors 60a, 60b and/or 60c), for example. If the seat 10 is not occupied, the controller 58 may operate the movement mechanism 33 and/or one or both of the adjustment mechanisms 66 in order to return the main portion 24 and the speakers 32 to corresponding home positions at step 212. For example, the controller 58 may cause the movement mechanism 33 to move the main portion 24 to the home position shown in FIG. 1, and may further cause the adjustment mechanisms 66 to move each speaker 32 to a retracted, pivot neutral, home position in which a front surface of the speaker 32 is generally flush or aligned with a front surface of the main portion 24 (shown in FIG. 6A for one of the speakers 32).

If the seat 10 is occupied, the controller 58 may also determine if an automatic, self-adjusting feature has been activated for both the head restraint 20 and associated speakers 32, as indicated at step 214. For example, the controller 58 may determine if a switch, button, indicator, etc. has been moved to an "on" position in order to activate automatic adjustment of the head restraint 20 and associated speakers 32. If not, the controller 58 may be configured to receive user input to adjust position of the main portion 24 of the head restraint 20 and/or position of one or more of the speakers 32 as indicated at step 216. For example, referring to step 218, the controller 58 may communicate with an input device having input features (e.g., buttons, knobs, switches, etc.) that the seat occupant or other vehicle occupant or user may use to adjust position of the head restraint 20 and/or position of one or more of the speakers 32.

Desired or preferred location information for one or more potential seat occupants may also be stored in memory associated with the control arrangement 57, e.g., the memory associated with the controller 58, and the controller 58 may be configured to retrieve the stored location information upon occupant identification. Furthermore, occupant identification may be handled manually (e.g., by the occupant activating a button or switch associated with the occupant) or automatically (e.g., by the detection system 59 detecting size, shape, fingerprint, retina characteristic and/or other biometric information of the occupant). The controller 58 may then use the retrieved location information to move the head restraint 20 and associated speakers 32 to the desired or preferred locations associated with the particular occupant.

If instead the automatic, self-adjusting feature has been activated, the controller 58 may collect input from various sources (e.g., the detection system 59, the above-mentioned input devices, etc.) as indicated at step 220. Referring to step 222, that input may then be used by the controller 58 to estimate position of the seat occupant's head 28 and/or a portion of the seat occupant's head 28, such as her ears. As indicated at step 224, the controller 58 may estimate optimal location for the speakers 32 using information collected from or detected by various proximity sensors (e.g., sensors 60b), as well as parameters related to optimal audio quality (e.g., optimal distance between speaker and occupant's ear, tilt angle, etc.) as indicated at 226. Next, the controller 58 may determine whether or not any changes are required in speaker location in order to achieve optimal speaker location, as indicated at step 228. If not, then the controller 58 may determine whether or not future location changes are desired if input conditions change, as indicated at step 230. If changes to location of one or more of the speakers 32 are needed based on the collected input, then the controller 58 may automatically adjust the main portion 24 and/or position of one or more of the speakers 32. In that regard, referring to step 232, the controller 58 may first determine if the speakers 32 are independently adjustable or movable with respect to the main portion 24. If not, the controller 58 may control the movement mechanism 33 to automatically adjust position of the main portion 24 in order to adjust position of the speakers 32 with respect to the occupant's ears, as indicated at step 234. If, however, the speakers 32 are adjustable or movable with respect to the main portion 24, then the controller 58 may control the movement mechanism 33 and/or one or both of the adjustment mechanisms 66 in order to adjust position of the speakers 32 with respect to the occupant's ears, as indicated at step 236. The controller 58 may then determine whether or not future location changes are desired if input conditions change, as indicated at step 230. If so, the process may return to the starting point. If not, then changes in input conditions may be ignored as indicated at step 238. Position information for the main portion 24 and speakers 32 may also be stored in memory of the control arrangement 57 and associated with the particular occupant.

Referring to FIG. 8, a portion of a second embodiment 20' of a head restraint according to the present disclosure is shown. The head restraint 20' includes similar features as the head restraint 20, and those similar features are identified with the similar reference numbers, except the similar reference numbers in FIG. 8 each include a prime mark. Therefore, the following description will primarily focus on the differences between the head restraint 20' and the head restraint 20. In that regard, the main portion 24' of the head restraint 20' includes movable wings 72 (the base 22' of the head restraint 20' is not shown in FIG. 8). Furthermore, the wings 72 may be automatically movable or pivotable with respect to a central portion 73 of the main portion 24'. For example, the head restraint 20' may include two movement actuators, such as pivot actuators 74 that are each configured to pivot a respective wing 72 about a hinge line 75. While the pivot actuators 74 may each have any suitable configuration, such as a piston/cylinder arrangement, motor and gear assembly, etc., each pivot actuator 74 in the illustrated embodiment is configured as an inflatable air bladder that is positioned between a cushion section 30' and a support section 31' of the main portion 24', and that is connected to a source of pressurized fluid (not shown) for inflating the bladder. In addition, the actuators 74 may be controlled by the above mentioned controller 58. With such a configuration, the controller 58 may control operation of a movement mechanism 33' (not shown) in order to automatically move the main portion 24' laterally with respect to the base (not shown) and/or control operation of one or both of the pivot actuators 74 in order to move one or both wings 72 with respect to the central portion 73 of the main portion 24' in order to position the main portion 24' based on position of the seat occupant's head 28. For example, the main portion 24' may be moved along a curved lateral path and/or one or both of the wings 72 may be pivoted with respect to the central portion 73 of the main portion 24' in order to position associated speakers 32' proximate the seat occupant's ears. As another example, the main portion 24' may be moved along a curved lateral path and/or one or both of the wings 72 may be pivoted with respect to the central portion 73 of the main portion 24' for blind spot reduction for the seat occupant.

Because each pivot actuator 74 may move a respective speaker 32' along with a respective wing 72, the pivot actuators 74 may be considered speaker adjustment mechanisms. In that regard, each pivot actuator 74 may function to move a respective speaker 32' with respect to at least a portion of the main portion 24', such as the central portion 73.

FIG. 9 shows another example configuration of a head restraint 20A' including a main portion 24A' having movable wings 72A, and each movable wing 72A may be moved or pivoted by a respective pivot actuator 74A. The head restraint 20A' also includes two speakers 32A' that are each mounted on a respective wing 72A and movable with the wing 72A. In the illustrated embodiment, each pivot actuator 74A includes one or more elongated pivot members, such as pivot arms $74A_1$, attached to a pivot motor $74A_2$. For example, each pivot actuator 74A may include two pivot arms $74A_1$ that support a respective speaker 32A and a respective wing 72A, and the associated pivot motor $74A_2$ is operable to pivot the pivot arms $74A_1$ to pivot the respective wing 72A relative to a central portion 73A of the main portion 24A'. Because each pivot actuator 74A is operable to pivot a respective speaker 32A', the pivot actuators 74A may be considered speaker adjustment mechanisms. In addition, the actuators 74A may be controlled by the above mentioned controller 58 in a similar manner as described above with respect to the head restraint 20'.

Figure 11:
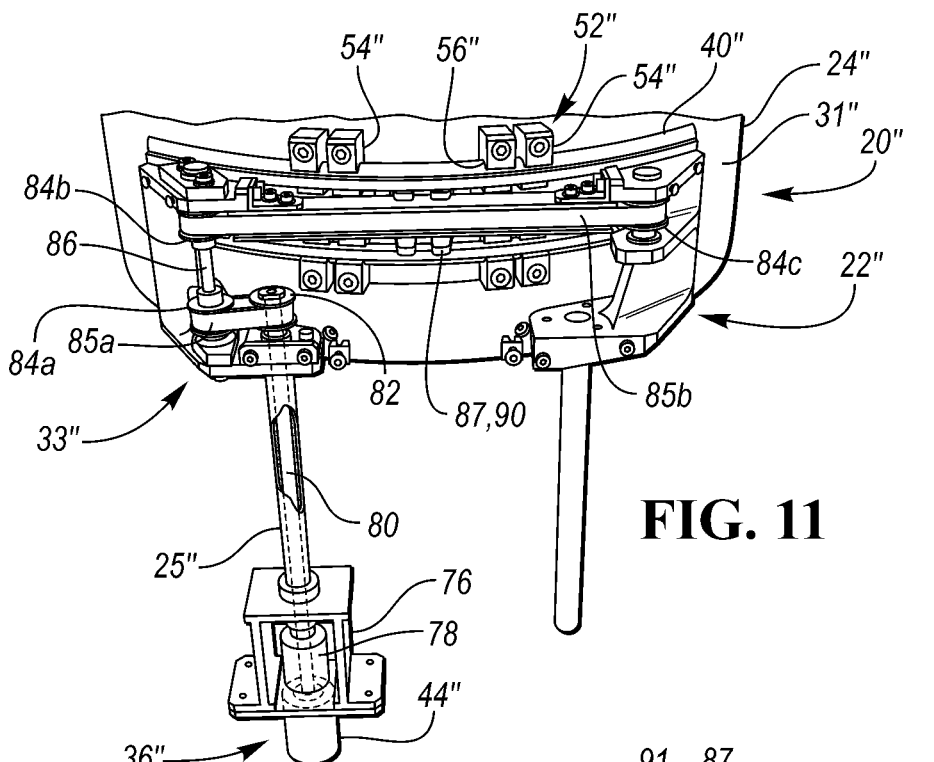
FIG. 11 is a rear view of the head restraint of FIG. 10 with a cover of the base portion removed to show additional features of the movement mechanism.
Figure 12:
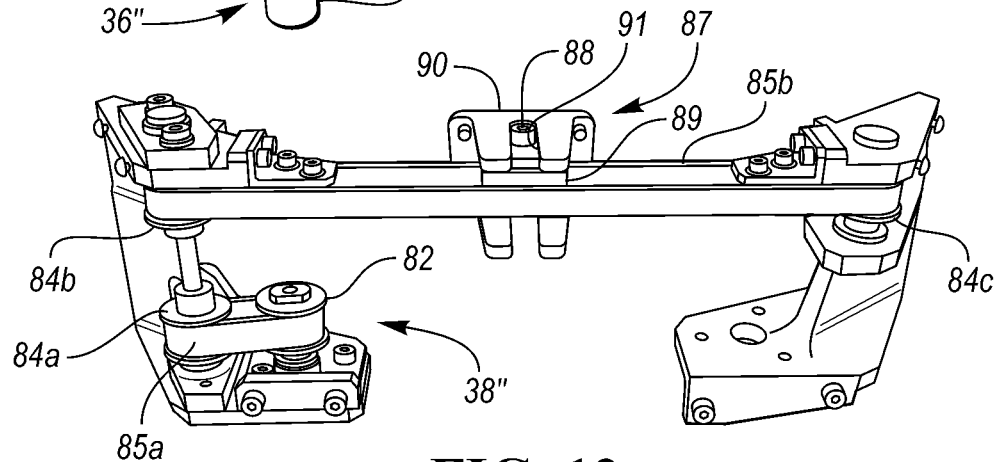
FIG. 12 is a rear perspective view of a portion of the movement mechanism of the head restraint of FIG. 10 showing a coupling arrangement for connecting the belt drive arrangement to the main portion.

FIGS. 10-12 show a third embodiment 20" of a head restraint according to the present disclosure. The head restraint 20" includes similar features as the head restraint 20, and those similar features are identified with the similar reference numbers, except the similar reference numbers in FIGS. 10-12 each include a double prime mark. Therefore, the following description will primarily focus on the differences between the head restraint 20" and the head restraint 20. In that regard, the head restraint 20" includes a movement mechanism 33" having a motor assembly 36" and a drive arrangement, such as a belt arrangement 38", that is connected to or otherwise associated with the motor assembly 36". The belt arrangement 38" is associated with at least one of a base 22" and a main portion 24" of the head restraint 20" (i.e., the belt arrangement 38" is associated with the base 22" and/or the main portion 24"), and the belt arrangement 38" is configured to cooperate with a guide member, such as a track, rack or rail 40", mounted on or otherwise associated with the base 22" or the main portion 24" to drive or move the main portion 24" with respect to base 22". In the embodiment shown in FIG. 10, the base 22" includes the rail 40", which has a curved configuration, and the belt arrangement 38" is mounted in the base 22" and is connected to the main portion 24", as explained below in more detail.

The motor assembly 36" includes an electric motor 44" and a drive arrangement 46" that is driven by the motor 44". In the embodiment shown in FIGS. 10 and 11, the motor 44" is fixedly mounted on a head restraint support or post 25" that is fixedly connected to the base 22" so that the motor 44" is movable with the head restraint post 25" as the head restraint 20" is vertically adjusted with respect to seat back 18". For example, the motor 44" may be connected to a support member, such as a housing 76, that is fixedly connected to the head restraint post 25". Furthermore, the housing 76 may receive a drive member of the drive arrangement 46", such as a drive rotor 78, that is rotatably connected to the motor 44". The seat back 18" may therefore be provided with a suitable cavity that is configured to allow vertical movement of the motor 44", housing 76 and drive rotor 78.

The drive arrangement 46" further includes a drive shaft 80 that extends inside of the head restraint post 25". The drive shaft 80 has a first end connected to the drive rotor 78, and a second end connected to a drive roller 82 that is mounted inside of a shell or housing 83 of the base 22".

The belt arrangement 38" includes one or more rotatable members, such as pulleys or rollers 84, and one or more flexible members, such as belts 85, associated with the rollers 84. In the illustrated embodiment, the belt arrangement 38" includes a first roller 84a connected to, or otherwise associated with, the drive roller 82 via a first belt 85a. The first roller 84a is connected to a second roller 84b by a connecting shaft 86 so that the first and second rollers 84a and 84b are rotatable together. The belt arrangement 38" further includes a third roller 84c spaced apart from the second roller 84b and connected to, or otherwise associated with, the second roller 84b via a second belt 85b. The rollers 84a-c are also rotatably mounted on support structure (e.g., one or more brackets) of the base 22".

Referring to FIGS. 11 and 12, the belt arrangement 38" may be connected to the main portion 24" by a coupling arrangement 87 so that the main portion 24" is movable with the belt arrangement 38", and specifically the second belt 85*b*. While the coupling arrangement 87 may have any suitable configuration, in the illustrated embodiment, the coupling arrangement 87 includes a connecting member, such as a pin 88, fixedly connected to the second belt 85*b* with a mounting member, such as a mounting block 89. The coupling arrangement 87 further includes a carrier member, such as a bracket, trolley or yoke 90, fixedly connected to the main portion 24" and configured to receive the pin 88. For example, the yoke 90 may have a slot 91 for receiving the pin 88, so that the pin 88 may move relative to the yoke 90 as the main portion 24" moves with the second belt 85*b* and along the rail 40".

When the motor 44" of the movement mechanism 33" is activated, the motor 44" is operable to drive the drive roller 82 in either of two directions, and the drive roller 82 cooperates with the belt arrangement 38" to drive the second belt 85*b* in either of two directions. As the second belt 85*b* moves, it causes the pin 88 to move the yoke 90, which in turn causes the main portion 24" to move with respect to the rail 40".

Like the head restraint 20, the head restraint 20" may also include a guide arrangement 52" for guiding movement of the main portion 24" relative to the base 22". For example, the guide arrangement 52" may include one or more brackets 54" connected to one of the base 22" and the main portion 24", and one or more guide members, such as bearings 56", connected to each bracket 54" and engageable with the other of the base 22" and the main portion 24". In the embodiment shown in FIGS. 10 and 11, the guide arrangement 52" includes multiple brackets 54" connected to the support section 31" of the main portion 24", and a single bearing 56" associated with each bracket 54" so that the bearings 56" are slidably engageable with the base 22". Specifically, the bearings 56" include four arcuate-shaped upper bearings 56" that engage an upper portion of the rail 40" of the base 22", and four arcuate-shaped lower bearings 56" that engage a lower portion of the rail 40" of the base 22".

Figure 13:
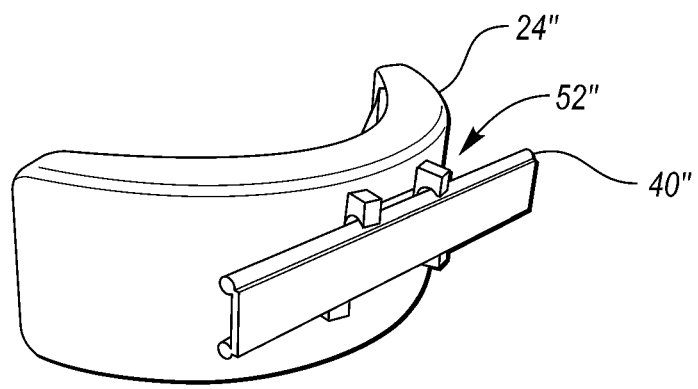
FIG. 13 is a rear perspective view of an alternative configuration of a guide member and guide arrangement of the head restraint of FIG. 10 for guiding movement of the main portion with respect to the base portion.

In the embodiment shown in FIGS. 10 and 11, the guide arrangement 52" cooperates with the rail 40" to guide the main portion 24" along a curved path defined by the rail 40" as the movement mechanism 33" moves the main portion 24" with respect to the base 22". Referring to FIG. 13, the guide member or rail 40" may instead have a straight configuration, and the guide arrangement 52" may cooperate with the rail to guide the main portion 24" along a straight lateral path defined by the rail 40".

Furthermore, the movement mechanism 33" of the head restraint 20" may be operated to automatically move the main portion 24" in a similar manner as described above with respect to the movement mechanism 33 of the head restraint 20. For example, the movement mechanism 33" may be controlled by the above described control arrangement 57, and specifically the controller 58. In that regard, the controller 58 may control the movement mechanism 33" to move the main portion 24" with respect to the base 22" based on at least one input factor related to position of the head 28 of the seat occupant or based on an impact event or potential impact event, as mentioned above with respect to the head restraint 20. In addition, the head restraint 20" and the controller 58 may together be referred to as a head restraint arrangement.

Figure 14A:
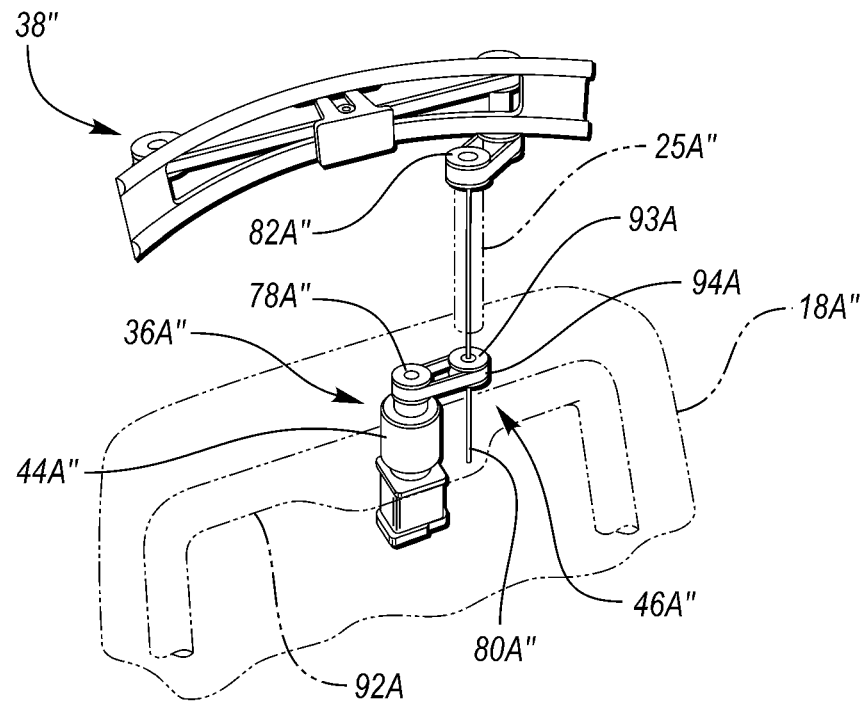
FIG. 14A shows a first alternative configuration of the motor assembly shown in FIG. 10, wherein the first alternative configuration includes a motor that is offset with respect to an associated head rest post.
Figure 14B:
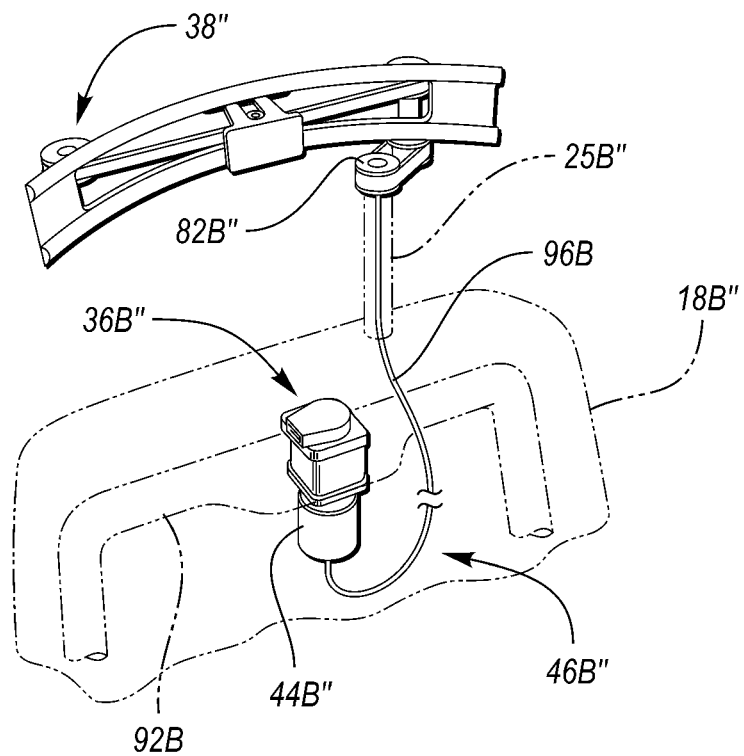
FIG. 14B shows a second alternative configuration of the motor assembly shown in FIG. 10, wherein the second alternative configuration includes a motor connected to a flexible drive.

FIGS. 14A and 14B show alternative configurations 36A" and 36B" for the motor assembly for driving the belt arrangement 38" shown in FIGS. 10-12. In the embodiment shown in FIG. 14A, the motor assembly 36A" includes an electric motor 44A" that is fixedly mounted within seat back 18A" in any suitable manner, and a drive arrangement 46A" that is driven by the motor 44A". For example, the motor 44A" may be connected to a seat back frame 92A of the seat back 18A" with one or more fasteners, such as bolts or screws. The drive arrangement 46A" includes a first drive member, such as a drive rotor 78A", that is rotatably connected to the motor 44A", and a second drive member, such as a drive roller 93A, that is connected to the drive rotor 78A" by a drive belt 94A. The drive arrangement 46A" further includes a drive shaft 80A" movably connected to the drive roller 93A and that extends inside of head restraint post 25A", and a drive roller 82A" mounted at an upper end of the drive shaft 80A". For example, a lower portion of the drive shaft 80A" may connected to the drive roller 93A so that the drive shaft 80A" is rotatable with the drive roller 93A, while also being vertically movable (e.g., slidable) with respect to the drive roller 93A. As a more detailed example, the drive shaft 80A" may have a cross sectional shape (e.g., square, hexagon, octagon) that is complementary to a shape of an opening in the drive roller 93A so that the drive shaft 80A" mates with the opening in the drive roller 93A. With such a configuration, the drive shaft 80A" may slide with respect to the drive roller 93A when the head restraint 20" is vertically adjusted with respect to the seat back 18A". Furthermore, as with the drive roller 82 of the motor assembly 36", the drive roller 82A" is configured to drive the belt arrangement 38".

In the embodiment shown in FIG. 14B, the motor assembly 36B" includes a motor 44B" that is fixedly mounted within seat back 18B" in any suitable manner, and a drive arrangement 46B" that is driven by the motor 44B". For example, the motor 44B" may be connected to a seat back frame 92B of the seat back 18B" with one or more fasteners, such as bolts or screws. The drive arrangement 46B" includes a flexible drive shaft 96B having one end that is connected to a drive member of the motor 44B", and an opposite end connected to drive roller 82B". The flexible drive shaft 96B extends inside of head restraint post 25B", and is rotatable by the motor 44B" in order to rotate the drive roller 82B". Furthermore, as with the drive roller 82 of the motor assembly 36", the drive roller 82B" is configured to drive the belt arrangement 38".

Figure 15:
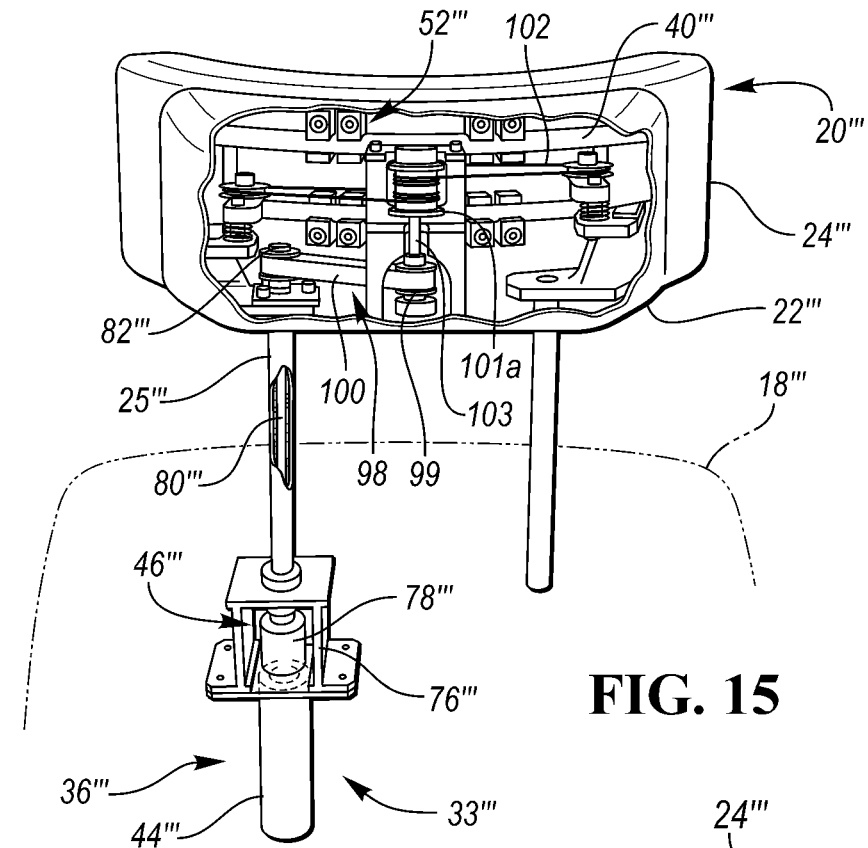
FIG. 15 is a rear perspective view of a fourth embodiment of a head restraint according to the present disclosure, wherein the head restraint includes a base portion, a main portion positioned in front of the base portion, and a movement mechanism for moving the main portion with respect to the base portion, and wherein the movement mechanism includes a motor assembly and a drive arrangement configured as a cable drive arrangement.
Figure 16:
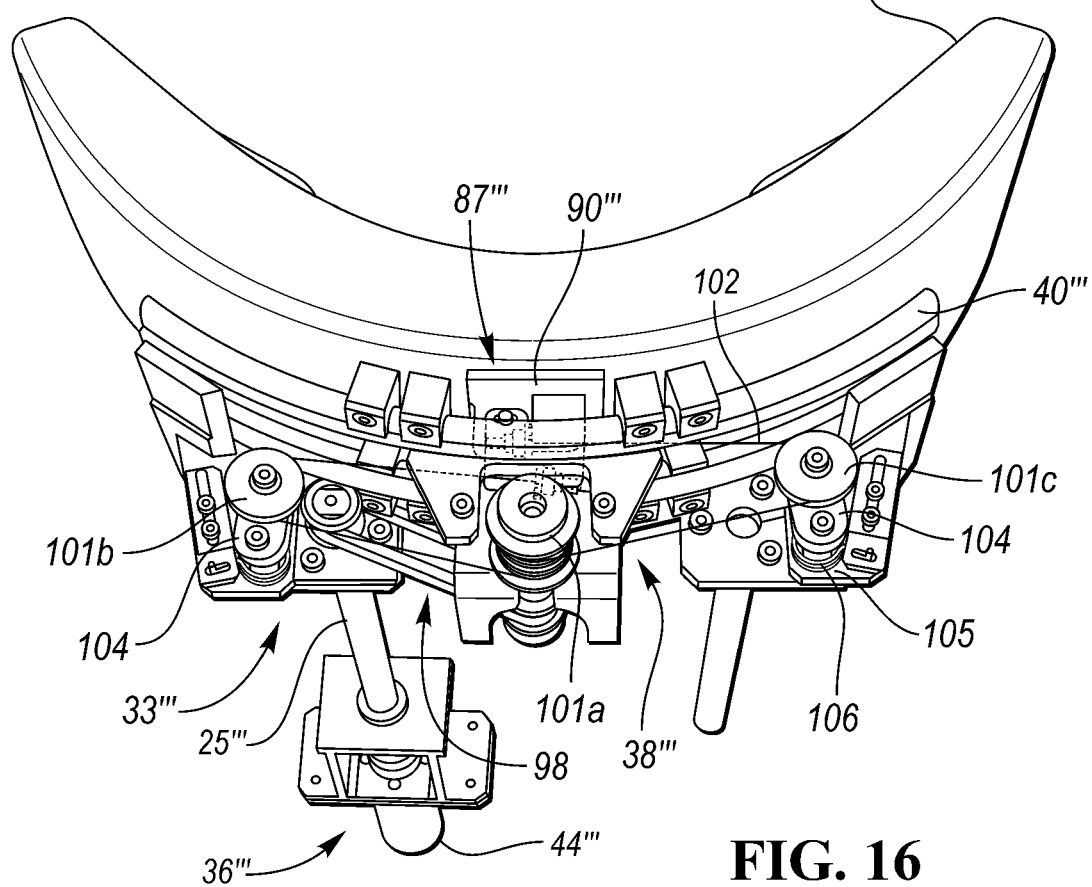
FIG. 16 is a rear perspective view of the head restraint of FIG. 15 with a cover of the base portion removed to show additional features of the movement mechanism.
Figure 17:
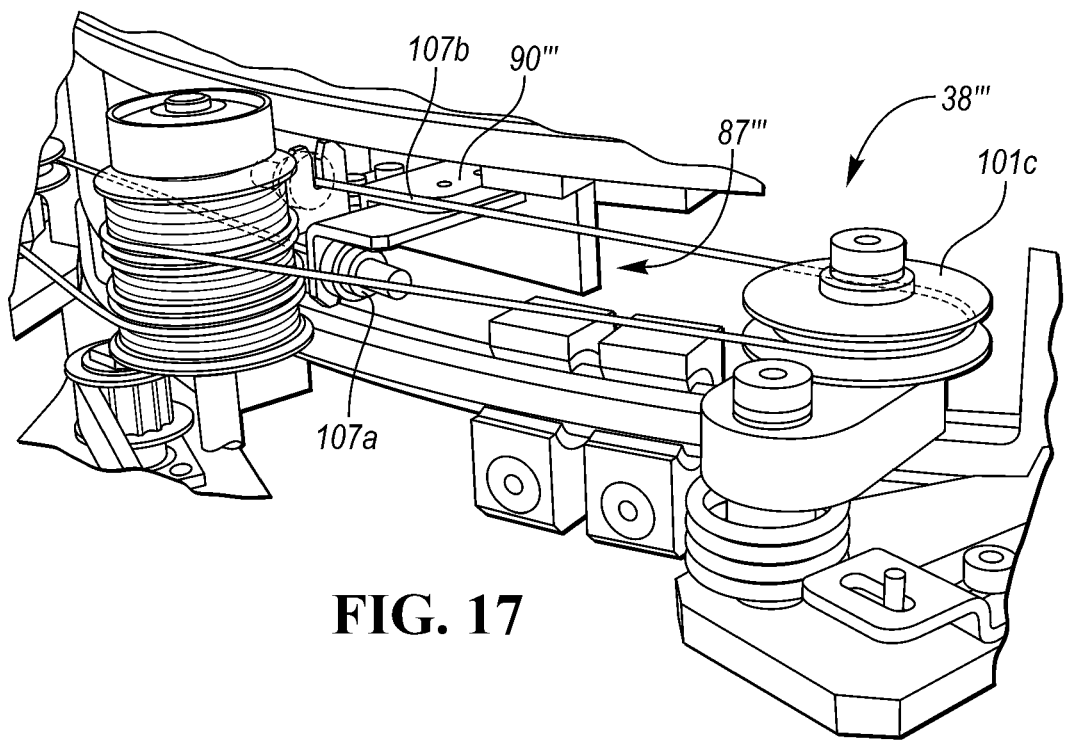
FIG. 17 is a rear perspective view of a portion of the cable drive arrangement of FIG. 15, with a first roller of the cable drive arrangement removed in order to show more clearly a coupling arrangement for connecting the cable drive arrangement to the main portion of the head restraint.

FIGS. 15-17 show a fourth embodiment 20''' of a head restraint according to the present disclosure. The head restraint 20''' includes similar features as the head restraint 20", and those similar features are identified with the similar reference numbers, except the similar reference numbers in FIGS. 15-17 each include a triple prime mark. Therefore, the following description will primarily focus on the differences between the head restraint 20''' and the head restraint 20". In that regard, the head restraint 20''' includes a movement mechanism 33''' having a motor assembly 36''' and a drive arrangement, such as a cable arrangement 38''', that is connected to or otherwise associated with the motor assembly 36'''. The cable arrangement 38''' is associated with at least one of a base 22''' and a main portion 24''' of the head restraint 20''' (i.e., the cable arrangement 38''' is associated with the base 22''' and/or the main portion 24'''), and the cable arrangement 38''' is configured to cooperate with a guide member, such as a track, rack or rail 40''', mounted on or otherwise associated with the base 22''' or the main portion 24''' to move the main portion 24''' with respect to base 22'''. In the embodiment shown in FIGS. 15 and 16, the base 22''' includes the rail 40''', which has a curved configuration, and the cable arrangement 38''' is mounted in the base 22''' and is connected to the main portion 24''', as explained below in more detail.

The motor assembly 36''' includes an electric motor 44''' and a drive arrangement 46''' that is driven by the motor 44'''. In the embodiment shown in FIGS. 15 and 16, the motor 44''' is fixedly mounted on a head restraint support or post 25''' that is fixedly connected to the base 22''' so that the motor 44''' is movable with the head restraint post 25''' as the head restraint 20''' is vertically adjusted with respect to seat back 18'''. For example, the motor 44''' may be connected to a support member, such as a housing 76''', that is fixedly connected to the head restraint post 25'''. Furthermore, the housing 76''' may receive a drive member of the drive arrangement 46'''', such as a drive rotor 78''', that is rotatably connected to the motor 44'''. The seat back 18''' may therefore be provided with a suitable cavity that is configured to allow vertical movement of the motor 44''', housing 76''' and drive rotor 78'''. The drive arrangement 46''' further includes a drive shaft 80''' that extends inside of the head restraint post 25''' and that is connected to the drive rotor 78''', and a drive roller 82''' mounted at an upper end of the drive shaft 80'''.

In the embodiment shown in FIGS. 15 and 16, the motor assembly 36''' is connected to the cable arrangement 38''' with an intermediate drive arrangement 98. The intermediate drive arrangement 98 includes a central roller 99 connected to, or otherwise associated with, the drive roller 82''' with a belt 100. Furthermore, the central roller 99 is rotatably mounted on support structure of the base 22''', such as a housing of the base 22'''. With such a configuration, the motor 44''' of the motor assembly 36''' may be laterally offset from the central roller 99.

The cable arrangement 38''' may include one or more rotatable members, such as pulleys or rollers 101, and one or more flexible members, such as cables 102, associated with the rollers 101. In the illustrated embodiment, the cable arrangement 38''' includes a grooved, central, first roller 101a connected to the roller 99 of the intermediate drive arrangement 98 by a shaft 103 so that the rollers 99 and 101a are rotatable together. The cable arrangement 38''' further includes second and third rollers 101b and 101c, respectively, connected to or otherwise associated with the first roller 101a by a cable 102, and positioned on opposite sides of the first roller 101a. The second and third rollers 101b and 101c are each rotatably mounted on a pivot arm 104 that is pivotally connected to support structure of the base 22''', such as a bracket 105 connected to the housing of the base 22'''. A spring 106 is connected between each pivot arm 104 and a respective bracket 105, and each spring 106 is configured to bias a free end of a respective pivot arm 104 outwardly away from a central portion of the base 22''' so that the rollers 101b and 101c apply tension to the cable 102.

Referring to FIGS. 16 and 17, the cable arrangement 38''' may be connected to the main portion 24''' by a coupling arrangement 87'''. While the coupling arrangement 87''' may have any suitable configuration, in the illustrated embodiment, the coupling arrangement 87''' includes a carrier member, such as a bracket 90''', fixedly connected to the main portion 24''' and fixedly connected to opposite ends of the cable 102. Referring to FIG. 17, a first end 107a of the cable 102, which extends from the second roller 101b, is connected at a first location on the bracket 90''', and a second end 107b of the cable 102, which extends from the third roller 101c, is connected at a second location on the bracket 90'''.

When the motor 44''' of the movement mechanism 33''' is activated, the motor 44''' is operable to drive the drive roller 82''' in either of two directions, and the drive roller 82''' cooperates with the belt 100 to drive the roller 99 of the intermediate drive arrangement 98 in either of two directions. The roller 99 in turn causes the first roller 101a of the cable arrangement 38''' to rotate, which moves the cable 102 to thereby move the main portion 24''' with respect to the rail 40'''.

Furthermore, the movement mechanism 33''' of the head restraint 20''' may be operated to automatically move the main portion 24''' in a similar manner as described above with respect to the movement mechanism 33 of the head restraint 20. For example, the movement mechanism 33''' may be controlled by the above described control arrangement 57, and specifically the controller 58. In that regard, the controller 58 may control the movement mechanism 33''' to move the main portion 24''' with respect to the base 22''' based on at least one input factor related to position of the head 28 of the seat occupant or based on an impact event or potential impact event, as mentioned above with respect to the head restraint 20. In addition, the head restraint 20''' and the controller 58 may together be referred to as a head restraint arrangement.

Figure 18:
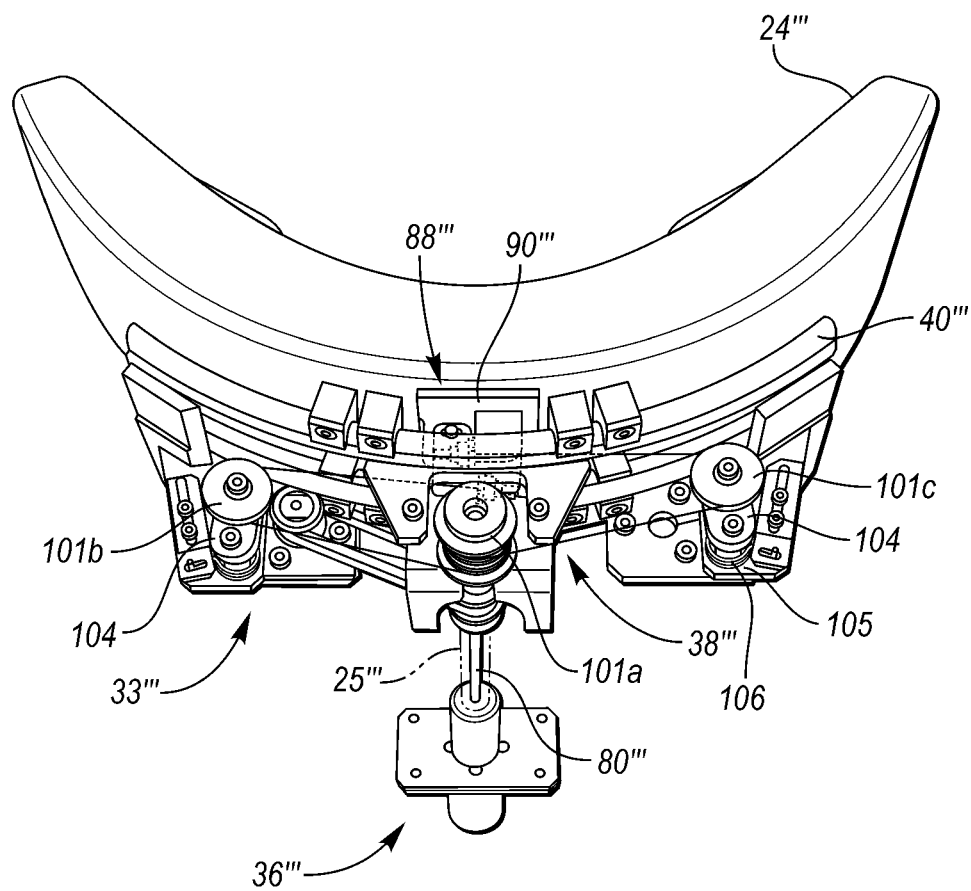
FIG. 18 is rear perspective view of an alternative configuration of the motor assembly of the head restraint of FIG. 15.

FIG. 18 shows an alternative configuration of the motor assembly 36''' of the head restraint 20''' of FIGS. 14-16. In the embodiment shown in FIG. 18, motor assembly 36''' is positioned directly beneath the first roller 101a of the cable arrangement 38''' to provide a direct drive configuration. For example, the drive shaft 80''' of the motor assembly 36''' may be axially aligned with the first roller 101a and/or the drive shaft 80''' may be connected directly to the first roller 101a. With such a configuration, the head restraint 20''' may be provided with a single support post 25''', which may extend from a central portion of the base 22'''.

FIGS. 19 and 20 show a fifth embodiment 20'''' of a head restraint according to the present disclosure for use with a vehicle seat 10''''. The head restraint 20'''' includes similar features as the head restraint 20''', and those similar features are identified with the similar reference numbers, except the similar reference numbers in FIGS. 19 and 20 each include a quadruple prime mark. Therefore, the following description will primarily focus on the differences between the head restraint 20'''' and the head restraint 20'''. In that regard, the head restraint 20'''' includes a main portion 24'''' having a first part or section 108 and a second part or section 110 that extends between the first section 108 and base 22'''' when the seat 10'''' is mounted in a vehicle (not shown). Therefore, the first section 108 is configured to be positioned in front of the second section 110 when the seat 10'''' is mounted in the vehicle so that the first section 108 is positioned between the second section 110 and a head of a seat occupant.

The head restraint 20'''' further includes an additional movement mechanism 112 associated with the main portion 24'''' and configured to move the first section 108 away from and toward a seat back 18'''' of the seat 10'''' (e.g., upwardly and downwardly when the seat back 18'''' is in an upright, use position) and with respect to the second section 110 and the base 22''''. In one embodiment, the first section 108 may be movable generally vertically along a path (e.g., straight path, curved path, etc.) that extends at an angle in the range of +/−45° with respect to a vertical plane, line or axis when the seat back is in an upright, use position (e.g, when the seat back is reclined at an angle in the range of 0 to +30°. In another embodiment, the first section 108 may be movable along a path that extends at an angle α in the range of +/−60° with respect to the seat back 18'''' (e.g., a longitudinal axis 113 that extends through a central portion of the seat back 18''''). In another embodiment, the first section 108 may be movable along a path that extends at an angle α in the range of +/−30° with respect to the seat back 18'''' (e.g., the longitudinal axis 113 of the seat back 18'''). In another embodiment, the first section 108 may be movable along a path defined at an angle of 0 to +60° with respect to the seat back (e.g., the longitudinal axis 113 of the seat back 18'''').

While the additional movement mechanism 112 may have any suitable configuration, such as a gear drive arrangement, belt drive arrangement, and/or cable drive arrangement, in the embodiment shown in FIGS. 19 and 20, the additional movement mechanism 112 includes a rack and pinion arrangement 114. The rack and pinion arrangement 114 includes a track, rail or rack 116 attached to one of the first section 108 and the second section 110 of the main portion 24'''', and a pinion 118 attached to the other of the first section 108 and the second section 110. In the illustrated embodiment, the rack 116 is fixed to the first section 108, and the pinion 118 is rotatably attached to the second section 110. The rack and pinion arrangement 114 further includes an electric motor 120 attached to the pinion 118 and configured to rotate the pinion 118 in first and second opposite directions. In the illustrated embodiment, the motor 120 is also mounted on the second section 110.

In the illustrated embodiment, the motor 120 may be operated to rotate the pinion 118 in the first direction in order to move the first section 108 upwardly with respect to the second section 110 and the base 22'''' from a home position shown in solid lines to a raised position shown in phantom lines. The motor 120 may also be operated to rotate the pinion 118 in the second direction in order to move the first section 108 downwardly with respect to the second section 110 and the base 22'''' from the raised position, or the home position, to a lowered position also shown in phantom lines. Depending on the orientation of the seat back 18'''', the orientation of the head restraint 20'''' and/or the configuration of the head restraint 20'''', the first section 108 may move vertically, at an angle with respect to a vertical plane, or otherwise upwardly and downwardly. Furthermore, if the seat back 18'''' is reclined sufficiently (e.g., at a +90° angle), movement of the first section 108 may no longer include a vertical component such that movement of the first section 108 may be generally described as away from or toward the seat back 18''''.

The head restraint 20'''' may also include a guide arrangement 122 for guiding upward/downward movement of the first section 108 relative to the second section 110 and the base 22''''. While the guide arrangement 122 may have any suitable configuration and include any suitable components, such as one or more rollers or bearings, in the embodiment shown in FIG. 19, the guide arrangement 122 includes one or more guide members 124, such as blocks or rails, mounted on one of the first and second sections 108 and 110, and one or more guide grooves, slots or channels 126 provided on the other of the first and second sections 108 and 110 for receiving the guide members 124. For example, the guide arrangement 122 may include two guide members 124 that are mounted on the first section 108, and each guide member 124 is slidable vertically in a corresponding channel 126 formed on the second section 110 when the first section 108 is moved vertically with respect to the second section 110.

Furthermore, the head restraint 20'''' may also include one or more speaker assemblies or speakers 32'''' attached to the main portion 24''''. In the embodiment shown in FIG. 19, the head restraint 20'''' includes two speakers 32'''' attached to the first section 108 of the main portion 24'''' so that the speakers 32'''' are movable with the first section 108.

Similar to previous embodiments, the additional movement mechanism 112 of the head restraint 20'''' may be operated to automatically move the first section 108 and speakers 32'''' with respect to the second section 110 and the base 22''''. For example, the motor 120 of the additional movement mechanism 112 may be controlled by the above described control arrangement 57, and specifically the controller 58. In that regard, the controller 58 may control the motor 120 of the additional movement mechanism 112 to move the first section 108 with respect to the base 22'''' based on at least one input factor related to position of the head of the seat occupant or based on an impact event or potential impact event, as mentioned above with respect to the head restraint 20. For example, if the one or more detection devices 60 of the detection system 59 of the control arrangement 57 provide input to the controller 58 indicating that the seat occupant has raised her head, or is in the process of raising her head, then the controller 58 may activate the additional movement mechanism 112 to move the first section 108 upwardly with respect to the second section 110 and the base 22''''. Likewise, if the one or more detection devices 60 provide input to the controller 58 indicating that the seat occupant has lowered her head, or is in the process of lowering her head, then the controller 58 may activate the additional movement mechanism 112 to lower the first section 108 with respect to the second section 110 and the base 22''''.

Like the previous embodiments, the head restraint 20'''' also includes a movement mechanism (e.g., movement mechanism 33, movement mechanism 33', movement mechanism 33'', or movement mechanism 33''') for moving the entire main portion 24'''' laterally with respect to the base 22''''. Also like the previous embodiments, that movement mechanism may move the entire main portion 24'''' along a straight lateral path or along a curved lateral path. Furthermore, that movement mechanism may be operated to automatically move the main portion 24'''' in a similar manner as described above with respect to the movement mechanism 33 of the head restraint 20. For example, the movement mechanism of the head restraint 20'''' may be controlled by the above described control arrangement 57, and specifically the controller 58. In addition, the head restraint 20'''' and the controller 58 may together be referred to as a head restraint arrangement.

Figure 21:
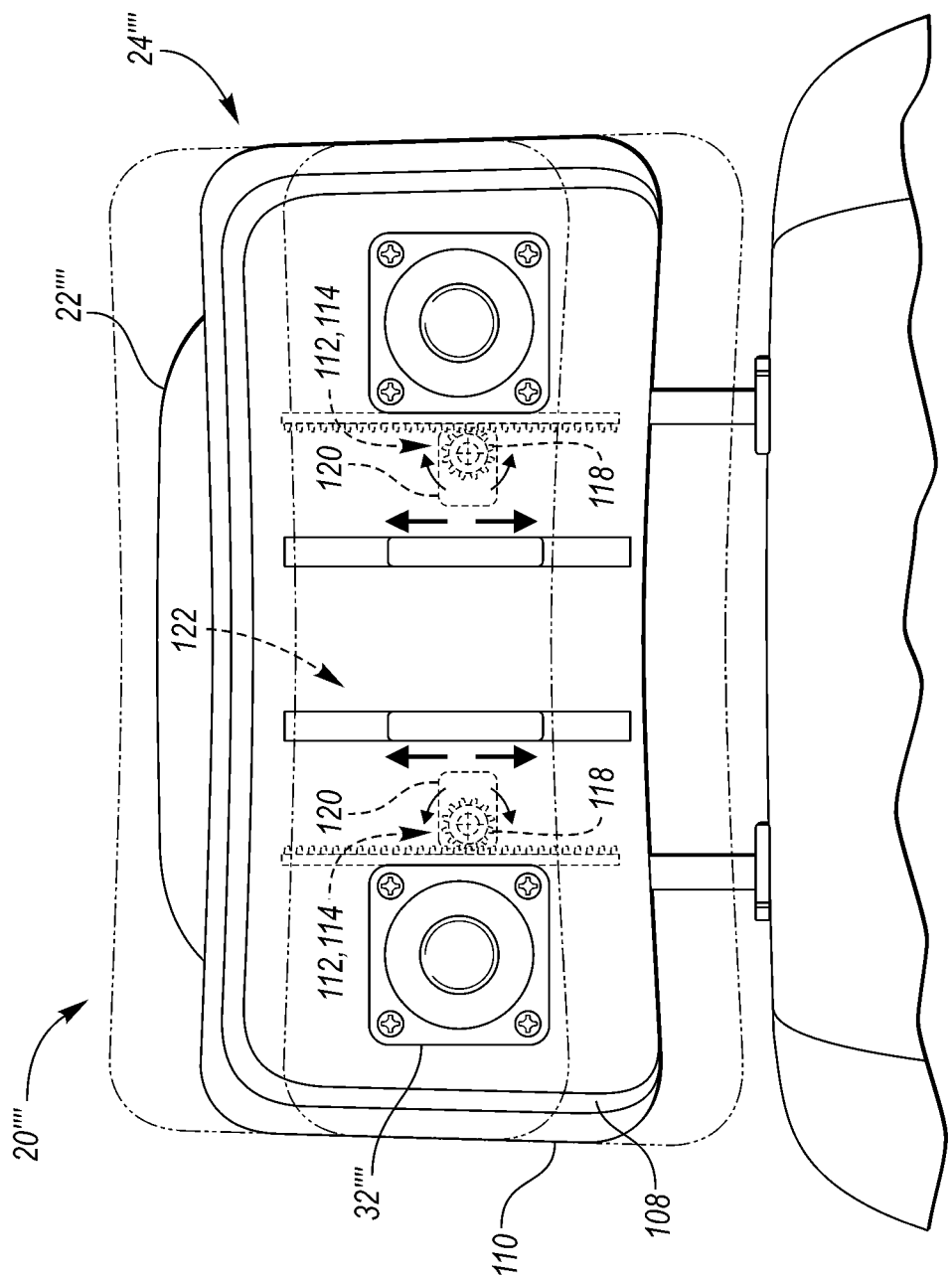
FIG. 21 is a front schematic view of an alternative configuration of the head restraint of FIG. 19.

FIG. 21 shows a variant of the head restraint 20'''', which includes two additional movement mechanisms 112. In that embodiment, each additional movement mechanism 112 is configured as a rack and pinion arrangement 114. With two spaced apart additional movement mechanisms 112, undesired tilting of the first section 108 relative to the second section 110 may be avoided during vertical adjustment of the first section 108.

A head restraint according to the disclosure may provide numerous benefits. For example, the main portion of the head restraint may provide effective support to a head of a seat occupant when needed, and the main portion or a part thereof may be automatically adjusted to follow movement of the seat occupant's head. Furthermore, the main portion may be rapidly moved to a home position in case of an impact event or potential impact event. In addition, if the head restraint includes one or more speakers, the main portion or a part thereof may be moved based on head position and/or the speakers may be moved with respect to the main portion in order to optimally position the speakers with respect to the seat occupant's head.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure. For example, any of the above embodiments may be provided with movable wings such as described above with respect to the head restraint 20'. As another example, any of the above embodiments may be provided with a straight rail for guiding movement of the associated main portion of the head restraint. As yet another example, any of the above embodiments may be provided with speakers mounted on the associated head restraint main portion, and an adjustment mechanism associated with each speaker for moving the speaker with respect to the main portion, such as described above with respect to the head restraint 20. As still yet another example, any of the above head restraint embodiments may be provided with the above described main portion including first and second sections, as well as the additional movement mechanism for moving the first section upwardly and/or downwardly relative to the second section and the respective base.

What is claimed is:

1. A head restraint for a seat for use with a motor vehicle, the head restraint comprising:
    a base configured to be attached to the seat;
    a main portion configured to be positioned between the base and a head of a seat occupant when the base is attached to the seat and the seat is mounted in the vehicle; and
    at least one movement mechanism associated with at least one of the base and the main portion and configured to move at least part of the main portion laterally or upwardly and downwardly relative to the base, wherein the at least one movement mechanism includes a motor and a cable drive arrangement associated with the motor.

2. The head restraint of claim 1 wherein the main portion comprises a first section and a second section that extends between the first section and the base, and wherein the at least one movement mechanism is configured to move the first section upwardly and downwardly with respect to the second section and the base.

3. The head restraint of claim 2 further comprising a guide arrangement for guiding movement of the first section relative to the second section, wherein the guide arrangement includes a guide member mounted on one of the first and second sections, and a channel provided on the other of the first and second sections for receiving the guide member.

4. The head restraint of claim 2 further comprising a speaker attached to the first section of the main portion and movable with the first section.

5. The head restraint of claim 1 wherein the main portion comprises a first section and a second section that extends between the first section and the base, wherein the at least one movement mechanism includes a first movement mechanism configured to move the first and second sections laterally relative to the base, and a second movement mechanism configured to move the first section upwardly and downwardly relative to the second section, and wherein the first movement mechanism includes the motor and the cable drive arrangement associated with the motor.

6. The head restraint of claim 1 wherein the at least one movement mechanism includes a first movement mechanism configured to move the main portion laterally relative to the base, and wherein the first movement mechanism includes the motor and the cable drive arrangement associated with the motor.

7. The head restraint of claim 6 wherein the first movement mechanism is configured to move the main portion along a straight lateral path.

8. The head restraint of claim 6 wherein the first movement mechanism is configured to move the main portion along a curved lateral path.

9. The head restraint of claim 1 wherein the main portion has a first surface configured to face the head of the seat occupant, and a second surface opposite the first surface and configured to face the base, and wherein the main portion is rotatable about an upright axis.

10. The head restraint of claim 1 further comprising a guide arrangement for guiding movement of the main portion relative to the base, wherein the guide arrangement includes a roller rotatably connected to one of the base and the main portion and engageable with the other of the base and the main portion.

11. The head restraint of claim 1 further comprising a guide arrangement for guiding movement of the main portion relative to the base, wherein the guide arrangement includes a bearing connected to one of the base and the main portion and engageable with the other of the base and the main portion.

12. The head restraint of claim 1 further comprising a speaker movably attached to the main portion, and an adjustment mechanism associated with the speaker and configured to adjust position of the speaker with respect to the main portion.

13. The head restraint of claim 1 wherein the main portion includes a movable wing, and the head restraint further comprises a speaker attached to the movable wing.

14. The head restraint of claim 1 wherein the main portion has an arcuate shape and includes a central portion that is configured to be positioned directly behind the head of the seat occupant when the main portion is in a home position with respect to the base, the base is attached to the seat and the seat is mounted in the vehicle.

15. The head restraint of claim 1 wherein the main portion is configured to face an entire rear portion of the head of the seat occupant when the main portion is in a home position with respect to the base, the base is attached to the seat and the seat is mounted in the vehicle.

16. The head restraint of claim 1 wherein the main portion is configured to be positioned in front of the base when the base is attached to the seat and the seat is mounted in the vehicle.

17. A head restraint arrangement for use with a seat of a motor vehicle, the head restraint arrangement comprising:
    a head restraint including a base that is attachable to the seat, a main portion configured to be positioned between the base and a head of a seat occupant when the base is attached to the seat and the seat is mounted in the vehicle, and at least one movement mechanism associated with at least one of the base and the main portion and configured to move at least part of the main portion laterally or upwardly and downwardly relative to the base; and
    a controller configured to control operation of the at least one movement mechanism, wherein the controller is configured to control the at least one movement mechanism to return the main portion to a home position based on an impact event or potential impact event.

18. The head restraint arrangement of claim 17 wherein one of the base and the main portion includes a guide member having multiple teeth, and the at least one movement mechanism comprises a gear rotatably mounted on the other of the base and the main portion and engageable with the guide member.

19. The head restraint arrangement of claim 18 wherein the at least one movement mechanism further comprises a motor assembly attached to the other of the base and the main portion, the motor assembly including a motor and a rotatable drive member configured to drive the gear.

20. The head restraint arrangement of claim 17 wherein the at least one movement mechanism includes a motor and a belt drive arrangement associated with the motor.

21. The head restraint arrangement of claim 17 wherein the controller is configured to control the at least one movement mechanism to automatically move the at least part of the main portion based on at least one input related to position of the head of the seat occupant.

22. The head restraint arrangement of claim 17 wherein the controller is configured to control the at least one movement mechanism to adjust the main portion for blind spot reduction.

23. The head restraint arrangement of claim 17 wherein the head restraint further comprises a speaker attached to the main portion, and the controller is configured to control the at least one movement mechanism to move the at least part of the main portion based on at least one input factor related to position of at least a portion of the head of the seat occupant in order to adjust position of the speaker relative to the head of the seat occupant.

24. The head restraint arrangement of claim 17 wherein the head restraint further comprises a speaker attached to the main portion, and an adjustment mechanism for adjusting position of the speaker with respect to the main portion, and wherein the controller is configured to control the at least one movement mechanism and/or the adjustment mechanism based on at least one input factor related to location of an ear of the seat occupant in order to adjust position of the speaker relative to the ear of the seat occupant.

25. The head restraint arrangement of claim 17 wherein the main portion is configured to be positioned in front of the base when the base is attached to the seat and the seat is mounted in the vehicle.

26. A vehicle seat for a motor vehicle, the vehicle seat comprising:
   a seat back; and
   a head restraint including a base associated with the seat back, a main portion configured to be positioned between the base and a head of a seat occupant when the vehicle seat is mounted in the vehicle and the seat occupant is positioned on the seat, and at least one movement mechanism associated with at least one of the base and the main portion and configured to move at least part of the main portion laterally or upwardly and downwardly relative to the base when the seat back is in an upright position, wherein the main portion comprises a first section and a second section that extends between the first section and the base, and wherein the at least one movement mechanism is configured to move the first section upwardly and downwardly, along an upright axis, with respect to the second section and the base when the seat back is in the upright position.

27. The vehicle seat of claim 26 wherein the at least one movement mechanism comprises a rack and pinion arrangement including a rack attached to one of the first section and the second section, and a pinion attached to the other of the first section and the second section.

28. The vehicle seat of claim 26 wherein the at least one movement mechanism is configured to automatically move the at least part of the main portion of the head restraint, and wherein the base is attached to the seat back with a support member so that the base is spaced away from the seat back.

29. A head restraint arrangement for use with a seat of a motor vehicle, the head restraint arrangement comprising:
   a head restraint including a base that is attachable to the seat, a main portion configured to be positioned between the base and a head of a seat occupant when the base is attached to the seat and the seat is mounted in the vehicle, and at least one movement mechanism associated with at least one of the base and the main portion and configured to move at least part of the main portion laterally or upwardly and downwardly relative to the base; and
   a controller configured to control operation of the at least one movement mechanism, wherein the controller is configured to control the at least one movement mechanism to adjust the main portion for blind spot reduction.

30. A head restraint arrangement for use with a seat of a motor vehicle, the head restraint arrangement comprising:
   a head restraint including a base that is attachable to the seat, a main portion configured to be positioned between the base and a head of a seat occupant when the base is attached to the seat and the seat is mounted in the vehicle, a speaker attached to the main portion, and at least one movement mechanism associated with at least one of the base and the main portion and configured to move at least part of the main portion laterally or upwardly and downwardly relative to the base; and
   a controller configured to control operation of the at least one movement mechanism, wherein the controller is configured to control the at least one movement mechanism to move the at least part of the main portion based on at least one input factor related to position of at least a portion of the head of the seat occupant in order to adjust position of the speaker relative to the head of the seat occupant.

31. A head restraint arrangement for use with a seat of a motor vehicle, the head restraint arrangement comprising:
   a head restraint including a base that is attachable to the seat, a main portion configured to be positioned between the base and a head of a seat occupant when the base is attached to the seat and the seat is mounted in the vehicle, a speaker attached to the main portion, an adjustment mechanism for adjusting position of the speaker with respect to the main portion, and at least one movement mechanism associated with at least one of the base and the main portion and configured to move at least part of the main portion laterally or upwardly and downwardly relative to the base; and
   a controller configured to control operation of the at least one movement mechanism, wherein the controller is configured to control the at least one movement mechanism and/or the adjustment mechanism based on at least one input factor related to location of an ear of the seat occupant in order to adjust position of the speaker relative to the ear of the seat occupant.

* * * * *